(12) United States Patent
Morino

(10) Patent No.: US 11,181,772 B2
(45) Date of Patent: Nov. 23, 2021

(54) LIGHT-EMITTING MODULE, METHOD FOR MANUFACTURING THE SAME, AND LIQUID-CRYSTAL DISPLAY DEVICE

(71) Applicant: NICHIA CORPORATION, Anan (JP)

(72) Inventor: Nao Morino, Anan (JP)

(73) Assignee: NICHIA CORPORATION, Anan (JP)

( * ) Notice: Subject to any disclaimer, the term of this patent is extended or adjusted under 35 U.S.C. 154(b) by 1 day.

(21) Appl. No.: 16/941,316

(22) Filed: Jul. 28, 2020

(65) Prior Publication Data

US 2021/0033927 A1 Feb. 4, 2021

(30) Foreign Application Priority Data

Jul. 31, 2019 (JP) .............................. JP2019-141764

(51) Int. Cl.
  *G02F 1/13357* (2006.01)
  *F21V 8/00* (2006.01)
  *G02F 1/1335* (2006.01)

(52) U.S. Cl.
  CPC ..... *G02F 1/133603* (2013.01); *G02B 6/0065* (2013.01); *G02B 6/0068* (2013.01); *G02F 1/133605* (2013.01); *G02F 1/133612* (2021.01)

(58) Field of Classification Search
  CPC ......... G02F 1/133603; G02F 1/133605; G02F 1/133612; G02B 6/0065; G02B 6/0068
  See application file for complete search history.

(56) References Cited

U.S. PATENT DOCUMENTS

| | | | |
|---|---|---|---|
| 9,893,256 B2 | 2/2018 | Matsuda et al. | |
| 10,199,533 B2 | 2/2019 | Matsuda | |
| 10,866,456 B2 * | 12/2020 | Hayashi | .............. H01L 25/0753 |
| 2007/0013647 A1 | 1/2007 | Lee et al. | |

(Continued)

FOREIGN PATENT DOCUMENTS

| | | | |
|---|---|---|---|
| JP | 2006093490 A | * | 4/2006 |
| JP | 2006093490 A | | 4/2006 |

(Continued)

*Primary Examiner* — Mary Ellen Bowman
(74) *Attorney, Agent, or Firm* — Hunton Andrews Kurth LLP

(57) ABSTRACT

A light-emitting module includes a light-guiding plate having a light-extracting surface, a plurality of first light-emitting elements and a plurality of second light-emitting elements having a light-emission characteristic different from a light-emission characteristic of the first light-emitting elements, the first light-emitting elements and the second light-emitting elements being alternately mounted on a surface of the light-guiding plate opposite to the light-extracting surface, with electrodes facing a direction opposite to the light-extracting surface of the light-guiding plate, a light-reflective member covering each of the first light-emitting elements and each of the second light-emitting elements to expose electrodes of each of the first light-emitting elements and electrodes of each of the second light-emitting elements from a first surface, first wiring formed on the first surface to connect the electrodes of the first light-emitting elements, and second wiring formed on the first surface to connect the electrodes of the second light-emitting elements.

14 Claims, 26 Drawing Sheets

(56) References Cited

U.S. PATENT DOCUMENTS

| | | | | |
|---|---|---|---|---|
| 2007/0019394 A1* | 1/2007 | Park | ............ | G02B 6/0021 |
| | | | | 362/23.18 |
| 2007/0085944 A1* | 4/2007 | Tanaka | ............ | G02F 1/133603 |
| | | | | 349/69 |
| 2008/0101084 A1* | 5/2008 | Hsu | ............ | G02B 6/0065 |
| | | | | 362/612 |
| 2018/0239193 A1* | 8/2018 | Hayashi | ............ | H01L 33/502 |
| 2021/0072594 A1* | 3/2021 | Zhang | ............ | G02F 1/133605 |
| 2021/0096427 A1* | 4/2021 | Yagi | ............ | G02F 1/133606 |

FOREIGN PATENT DOCUMENTS

| | | | | | |
|---|---|---|---|---|---|
| JP | 2007027745 | A | | 2/2007 | |
| JP | 2014229676 | A | | 12/2014 | |
| JP | 2016225598 | A | | 12/2016 | |
| JP | 2017118098 | A | | 6/2017 | |
| JP | 2018133304 | A | * | 8/2018 | ............ H01L 33/62 |
| JP | 2018133304 | A | | 8/2018 | |
| WO | 2018/089189 | A1 | | 5/2018 | |

* cited by examiner

LIGHT-EMITTING MODULE, METHOD FOR MANUFACTURING THE SAME, AND LIQUID-CRYSTAL DISPLAY DEVICE

CROSS-REFERENCE TO RELATED PATENT APPLICATION

The present application claims priority under 35 U. S. C. § 119 to Japanese Patent Application No. 2019-141764, filed Jul. 31, 2019. The disclosure of Japanese Patent Application No. 2019-141764 is incorporated herein by reference in its entirety.

BACKGROUND

The present disclosure relates to a light-emitting module, a method for manufacturing the same, and a liquid-crystal display device.

A light-emitting device in which a plurality of first LED elements and a plurality of second LED elements having light-emission characteristics different from light-emission characteristics of the first LED elements are flip-chip mounted on a board having wiring electrodes is known (See, for example, Japanese Patent Publication No. 2014-229676). In this light-emitting device, the wiring electrodes connect the first LED elements in series and connect the second LED elements in series, and a portion of the wiring electrodes connecting the first LED elements to one another passes through between an anode electrode and a cathode electrode of the second LED element mounted on the board.

SUMMARY

However, high accuracy in mounting is required in the light-emitting device described above because the first LED elements and the second LED elements are flip-chip mounted on the board having the wiring electrodes.

Accordingly, an object of the present disclosure is to provide a light-emitting module having a structure that can relax the requirement to mount light-emitting elements accurately.

A light-emitting module according to an embodiment of the present disclosure includes a light-guiding plate having a light-extracting surface, a plurality of first light-emitting elements and a plurality of second light-emitting elements having a light-emission characteristic different from a light-emission characteristic of the first light-emitting elements, the first light-emitting elements and the second light-emitting elements being alternately mounted on a surface of the light-guiding plate opposite to the light-extracting surface, with electrodes facing opposite to the light-extracting surface of the light-guiding plate, a light-reflective member covering each of the first light-emitting elements and each of the second light-emitting elements to expose electrodes of each of the first light-emitting elements and electrodes of each of the second light-emitting elements from a first surface, first wiring formed on the first surface to connect the electrodes of the first light-emitting elements, and second wiring formed on the first surface to connect the electrodes of the second light-emitting elements.

Certain embodiments of the present disclosure can provide a light-emitting module having a structure that can relax the requirement to mount light-emitting elements accurately.

DETAILED DESCRIPTION OF EMBODIMENTS

Figure 1:
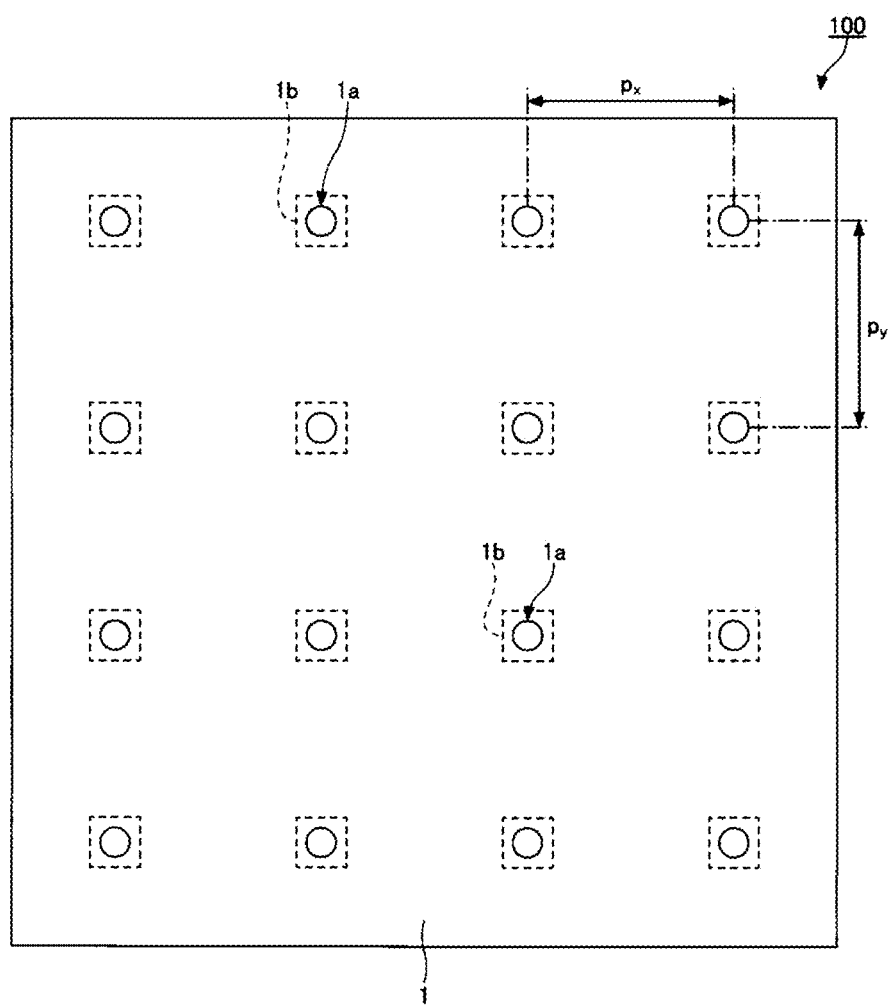
FIG. 1 is a schematic plan view of an illustrative light-emitting module according to a first embodiment of the present disclosure.

Certain embodiments of the invention will be described below referring to the accompanying drawings. The description below includes terms indicating specific directions or positions (such as "up", "down", and other terms containing these terms) as appropriate. These terms are used to facilitate understanding of the invention referring to the drawings, and the meanings of these terms do not limit the technical scope of the present invention. A portion with the same reference numeral in a plurality of drawings represents the same or equivalent portion or member.

In the embodiments described below, examples of light-emitting modules are described to give a concrete form to the technical idea of the present invention, and the present invention is not limited to the description below. Unless otherwise specified, sizes, materials, shapes, and relative positions of constituent components described below are not intended to limit the scope of the present invention thereto, but rather are described as examples. Constitutions described in one embodiment may be applicable to other embodiments and modified examples. Sizes or positional relationships of components illustrated in the drawings may be exaggerated in order to clarify the descriptions.

First Embodiment

Light-Emitting Module 100

Figure 2:
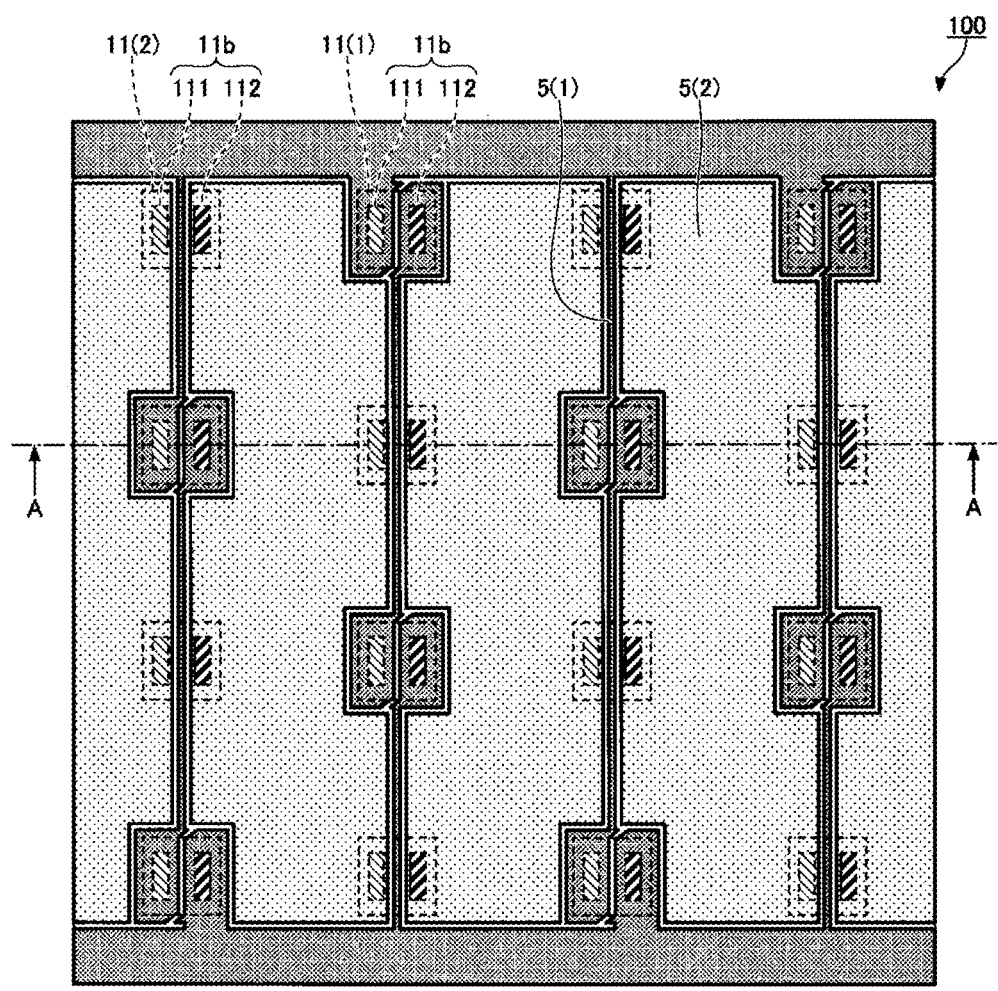
FIG. 2 is a schematic bottom view of the illustrative light-emitting module according to the first embodiment.
Figure 3A:
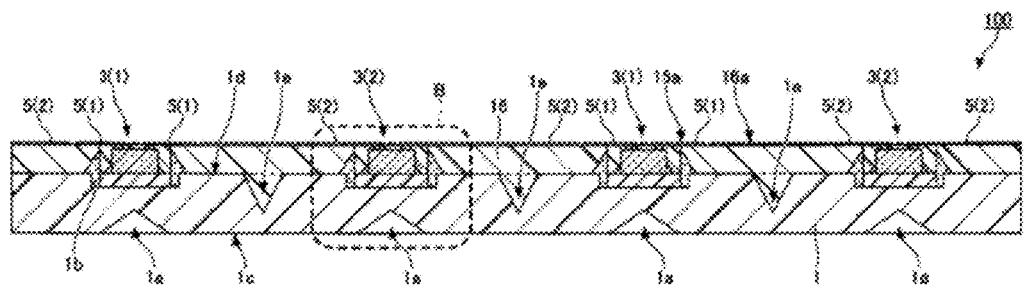
FIGS. 3A and 3B are schematic cross-sectional views of the illustrative light-emitting module according to the first embodiment.
Figure 3B:
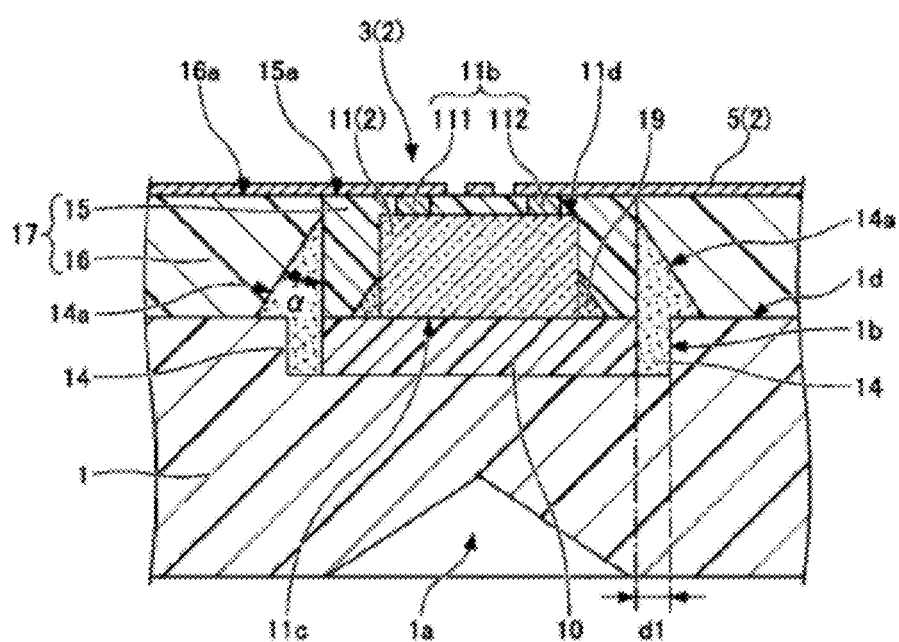

FIG. 1 is a schematic plan view of an illustrative light-emitting module according to a first embodiment of the present disclosure. FIG. 2 is a schematic bottom view of the illustrative light-emitting module according to the first embodiment. FIGS. 3A and 3B are schematic cross-sectional views of the illustrative light-emitting module according to the first embodiment viewed upside down with a light-guiding plate facing downward. FIG. 3A schematically shows a cross section along the line A-A of FIG. 2, and FIG. 3B is a schematic enlarged view of the portion B of FIG. 3A.

As shown in FIG. 1 to FIG. 3B, a light-emitting module 100 includes a light-guiding plate 1, light-emitting element units 3(1) and 3(2), bonding members 14, a second light-reflective member 16, first wiring 5(1), and second wiring 5(2). In the light-emitting module 100, a single light-guiding plate 1 has a plurality of recesses 1b, in each of which a respective one of the light-emitting element units 3(1) or 3(2) is disposed.

In the description below, "a plan view" refers to a view in which an object of interest is viewed in the normal direction of a first main surface 1c of the light-guiding plate 1, and "a shape in a plan view" refers to the shape of the object of interest viewed in the normal direction of the first main surface 1c of the light-guiding plate 1.

Light-Emitting Element Units 3(1) and 3(2)

The light-emitting element unit 3(1) includes a light-emitting element 11(1), a light-transmissive member 10 covering a main light-emitting surface 11c of the light-emitting element 11(1), and a first light-reflective member 15 covering lateral surfaces of the light-emitting element 11(1).

The light-emitting element unit 3(2) includes a light-emitting element 11(2), the light-transmissive member 10 covering the main light-emitting surface 11c of the light-emitting element 11(2), and the first light-reflective member 15 covering lateral surfaces of the light-emitting element 11(2).

The light-emitting element 11(1) differs from the light-emitting element 11(2) in light-emission characteristic. The statement "differ in light-emission characteristic" as used herein indicates, for example, that the light-emitting element 11(1) differs from the light-emitting element 11(2) in emission wavelength, and alternatively, that the light-emitting element 11(1) and the light-emitting element 11(2) are the same in emission wavelength and different in luminance.

The light-emitting element unit 3(1) and the light-emitting element unit 3(2) share the same structure except that light-emitting elements of the light-emitting element unit 3(1) have light-emission characteristics different from light-emission characteristics of light-emitting elements of the light-emitting element unit 3(2). In the description below, the light-emitting element unit 3(1) and the light-emitting element unit 3(2) are simply referred to as light-emitting element units 3 unless they need to be distinguished from each other. Similarly, the light-emitting element 11(1) and the light-emitting element 11(2) are simply referred to as light-emitting elements 11 unless they need to be distinguished from each other.

Light-Emitting Element 11

The light-emitting elements 11 each have the main light-emitting surface 11c, an electrode formation surface 11d opposite to the main light-emitting surface 11c, and lateral surfaces between the main light-emitting surface 11c and the electrode formation surface 11d.

The light-emitting element 11 is disposed such that, for example, the main light-emitting surface 11c faces the light-guiding plate 1. A pair of electrodes 11b are formed on the electrode formation surface 11d of the light-emitting element 11. One of the pair of electrodes 11b is an anode electrode 111, and the other one is a cathode electrode 112.

The light-emitting element 11 includes, for example, a light-transmissive substrate such as a sapphire substrate and a semiconductor layered structure layered on the light-transmissive substrate. The semiconductor layered structure includes a light-emitting layer and p-type and n-type semiconductor layers disposed such that the light-emitting layer is disposed between the p-type semiconductor layer and the n-type semiconductor layer. The p-type and n-type semiconductor layers are electrically connected to the anode electrode 111, which is the p-side electrode, and the cathode electrode 112, which is the n-side electrode, respectively.

There is no particular limitation on the length, width, and height of the light-emitting element 11. A semiconductor light-emitting element of preferably 1,000 μm or less, more preferably 500 μm or less, further preferably 200 μm or less, in length and width in a plan view is used for the light-emitting element 11.

With a light-emitting element 11 having a length and width within the above ranges, high-definition images can be provided through local dimming of a liquid-crystal display device. In particular, a light-emitting element 11 having the length and width of 500 μm or less is available at a low price, so that the cost of the light-emitting module 100 can be reduced.

A light-emitting element having a length and a width that are both 250 μm or less has a small area of the upper surface, and the amount of light emitted from the lateral surfaces of the light-emitting element is relatively increased. In other words, light emitted from such a light-emitting element is likely to have a batwing distribution, and such a light-emitting element is therefore preferably used in the light-emitting module 100 according to the first embodiment in which the light-emitting element is bonded to the light-guiding plate and in which the distance between the light-emitting element and the light-guiding plate is very short.

The height of the light-emitting element 11 is preferably in a range of 0.10 mm to 0.25 mm. The light-emitting element 11 preferably has such a height that the electrode formation surface 11d of the light-emitting element 11 protrudes from the recess 1b when the light-emitting element unit 3 is mounted in the recess 1b.

The light-emitting element 11 may have any appropriate shape, such as a square or elongated rectangular shape, in a plan view.

For a high-definition liquid-crystal display device, several thousand or more light-emitting elements are used, and mounting of the light-emitting elements is therefore important. With light-emitting elements each having an elongated rectangular shape in a plan view, even if rotational misalignment (such as misalignment in ±90° directions) of some of the light-emitting elements occur in the step of mounting the light-emitting elements, such rotational misalignment can be easily detected by visual observation. Further, formation of the first wiring 5(1) and the second wiring 5(2) is facilitated because the anode electrode 111 and the cathode electrode 112 can be formed apart from each other.

On the other hand, in the case in which light-emitting elements each having a square shape in a plan view are used, small light-emitting elements can be mass-produced. The density (intervals) of the light-emitting elements 11, in other words, distances between the light-emitting elements 11, can be, for example, in a range of about 0.05 mm to 20 mm, preferably about 1 mm to 10 mm. Intervals between the light-emitting elements 11 are distances between the centers of adjacent light-emitting elements 11(1) and 11(2). Each of the light-emitting elements 11 is designed to be disposed substantially at the center of a respective one of light-emitting element units 3, so that the intervals between the light-emitting element units 3 are also in a range of about 0.05 mm to 20 mm, preferably about 1 mm to 10 mm.

A known semiconductor light-emitting element can be used for each light-emitting element 11. In the first embodiment, a light-emitting diode mounted such that its electrodes face a direction opposite to the light-extracting surface of the light-guiding plate is illustrated for the light-emitting element 11. The light-emitting element 11 emits, for example, blue light. An element that emits light other than blue light can be used for the light-emitting element 11. For example, a color (such as blue) of light emitted from the light-emitting element 11 and a color (such as yellow) of light that has been subjected to wavelength conversion by the light-transmissive member 10, which is a wavelength conversion member, are mixed to generate white light, which is radiated from the light-emitting element unit 3.

An element that emits light with any appropriate wavelength can be selected for the light-emitting element 11. Examples of elements that emit blue and green light include a light-emitting element employing a nitride semiconductor ($In_XAl_YGa_{1-X-Y}N$, where $0 \leq X$, $0 \leq Y$, and $X+Y \leq 1$) or GaP. A light-emitting element containing a semiconductor such as GaAlAs and AlInGaP can be used for an element that emits red light. Alternatively, semiconductor light-emitting elements made of materials other than the materials described above can be used. The emission wavelengths can be changed by changing the materials for the semiconductor layers and their mixing ratios. The compositions, emission colors, sizes, and number of the light-emitting elements to be used may be appropriately selected according to the purpose.

Light-Transmissive Member 10

The light-transmissive member 10 is, for example, a wavelength conversion member and adjusts the wavelengths of light emitted from the light-emitting element 11 to emit the light toward the light-guiding plate 1. The case in which the light-transmissive member 10 is a wavelength conversion member is described below.

The light-transmissive member 10 covers the main light-emitting surface 11c of the light-emitting element 11 and transmits light emitted from the main light-emitting surface 11c. The light-transmissive member 10 may contain a substance that excites light emitted by the light-emitting element 11 or may contain a substance that diffuses and/or reflects the light.

The light-transmissive member 10 preferably has a thickness in a range of 0.05 mm to 0.30 mm. If the light-transmissive member 10 is too small, the effectiveness of wavelength conversion is reduced. If the thickness of the light-transmissive member 10 is too large, absorption of wavelength-converted light may occur. Accordingly, the thickness of the light-transmissive member 10 preferably is in the range described above.

The light-transmissive member 10 receives light emitted from the light-emitting element 11 and converts the light into light with different wavelengths. In the light-transmissive member 10, a wavelength conversion substance is dispersed in a base material. The light-transmissive member 10 may include a plurality of layers. For example, the light-transmissive member 10 can have a two-layer structure including a first layer in which a wavelength conversion substance is added to a base material and a second layer, which serves as a light-diffusing member, in which a diffusing material is added to a base material.

The base material may be a light-transmissive material such as an epoxy resin, a silicone resin, a mixture of these resins, and glass. It is effective to select a silicone resin as the base material in view of resistance to light and ease of formation of the light-transmissive member 10. For the base material of the light-transmissive member 10, a material having a refractive index higher than a refractive index of the material of the light-guiding plate 1 is preferably used.

An example of the wavelength conversion substance contained in the light-transmissive member 10 is a phosphor. Examples of the phosphor include YAG phosphors, β-SiAlON phosphors, and fluoride phosphors such as KSF phosphors. The light-transmissive member 10 may contain a single wavelength conversion substance or a plurality of wavelength conversion substances.

In the case in which the wavelength conversion member contains a plurality of wavelength conversion substances, for example, the wavelength conversion member can contain a β-SiAlON phosphor that emits light having a color in the green range and a fluoride phosphor, such as a KSF phosphor, that emits light having a color in the red range. This structure expands the color reproduction range of the light-emitting module 100. In this case, the light-emitting element 11 preferably contains a nitride semiconductor ($In_XAl_YGa_{1-X-Y}N$, where $0 \leq X$, $0 \leq Y$, and $X+Y \leq 1$), which can emit light with short wavelengths that can efficiently excite the light-transmissive member 10.

In the case of using, for example, a light-emitting element 11 configured to emit light having a color in the blue range to obtain a light-emitting module 100 that emits light having a color in the red range, the light-transmissive member 10 may contain 60 wt % or more, preferably 90 wt % or more, of a KSF phosphor (red phosphor). That is, the light-transmissive member 10 may contain a wavelength conversion member that emits light having a predetermined color to provide light having a predetermined color. For the wavelength conversion substance, quantum dots may be used. The wavelength conversion substance may be disposed in any appropriate arrangement inside the light-transmissive member 10. For example, the wavelength conversion substance may be substantially uniformly distributed or disposed predominantly in some portion. Also, a plurality of layers each containing a wavelength conversion substance may be layered in the light-transmissive member 10.

The phosphor contained in the light-transmissive member 10 of the light-emitting element unit 3(1) may be different from the phosphor contained in the light-transmissive member 10 of the light-emitting element unit 3(2) in order to make the emission color of the light-emitting element unit 3(1) different from the emission color of the light-emitting element unit 3(2).

Light-Transmissive Adhesive Member 19

A light-transmissive adhesive member 19 covers a portion of the lateral surfaces of the light-emitting element 11 and a portion of the light-transmissive member 10. An outer lateral surface of the light-transmissive adhesive member 19 is preferably an inclined surface spreading from a lateral surface of the light-emitting element 11 toward the light-transmissive member 10, more preferably a convex curved surface protruding toward the light-emitting element 11. With this structure, a larger amount of light emitted from the lateral surface of the light-emitting element 11 can be guided to the light-transmissive member 10, so that the light extraction efficiency can be enhanced.

The light-transmissive adhesive member 19 may be disposed between the main light-emitting surface 11c of the light-emitting element 11 and the light-transmissive member 10. For example, with the light-transmissive adhesive member 19 containing a diffusing agent or the like, light emitted from the main light-emitting surface 11c of the light-emitting element 11 is diffused in the light-transmissive adhesive member 19 before entering the light-transmissive member 10, so that unevenness in luminance can be reduced. The same member as the bonding member 14 described below can be used for the light-transmissive adhesive member 19.

First Light-Reflective Member 15

The first light-reflective member 15 covers the electrode formation surface 11d and the lateral surfaces of the light-emitting element 11. Specifically, the first light-reflective member 15 covers the electrode formation surface 11d of the light-emitting element 11, the lateral surfaces of the light-emitting element 11 not covered with the light-transmissive adhesive member 19, and the outer lateral surfaces of the light-transmissive adhesive member 19. In the light-emitting element unit 3, the first light-reflective member 15 is in contact with the light-transmissive member 10, and each of the outer lateral surfaces of the first light-reflective member 15 and a corresponding one of outer lateral surfaces of the light-transmissive member 10 are substantially in the same plane.

The first light-reflective member 15 is made of a material having good light reflectivity, preferably a white resin in which a light-reflective additive such as white powder is added to a transparent resin. In the light-emitting element unit 3, the first light-reflective member 15 covers the surfaces of the light-emitting element 11 other than the main light-emitting surface 11c to reduce leakage of light in the directions other than the direction toward the main light-emitting surface 11c. That is, the first light-reflective member 15 reflects light emitted from the lateral surfaces and the electrode formation surface 11d of the light-emitting element 11 to allow light emitted from the light-emitting element 11 to be effectively radiated to the outside through the first main surface 1c of the light-guiding plate 1, so that the light extraction efficiency of the light-emitting module 100 can be enhanced.

The first light-reflective member 15 is preferably made of a white resin having a reflectance of 60% or more, preferably 90% or more, of light emitted from the light-emitting element 11. The first light-reflective member 15 is preferably a resin containing a white pigment such as white powder. A silicone resin containing white inorganic powder such as titanium oxide is particularly preferable.

The first light-reflective member 15 is in contact with at least a portion of each of the lateral surfaces of the light-emitting element 11 and surrounds the light-emitting element 11 to embed the light-emitting element 11 such that the electrodes 11b of the light-emitting element 11 are exposed on a surface of the first light-reflective member 15.

Light-Guiding Plate 1

The light-guiding plate 1 is a light-transmissive member from which light incident from the light source is surface-emitted to the outside. The light-guiding plate 1 has the first main surface 1c serving as the light-emitting surface and a second main surface 1d opposite to the first main surface 1c. The second main surface 1d of the light-guiding plate 1 has a plurality of recesses 1b. In the first embodiment, grooves 1e are formed between adjacent recesses 1b.

Each light-emitting element unit 3 is disposed in a respective one of the recesses 1b. Specifically, a portion of the light-emitting element unit 3 is disposed in the recess 1b of the light-guiding plate 1 such that the light-transmissive member 10 faces the bottom surface of the recess 1b. This structure allows for reducing the thickness of an entirety of the light-emitting module. The light-guiding plate 1 can have a plurality of recesses 1b, and each of the light-emitting element units 3 can be disposed in a respective one of the recesses 1b to constitute the light-emitting module 100.

The second light-reflective member 16, which will be described below in detail, disposed in the grooves 1e is preferably a white resin that reflects light emitted from the light-emitting element units 3. The second light-reflective member 16 that is a white resin prevents light emitted from a light-emitting element 11 from being incident on an adjacent section of the light-guiding plate 1 divided by the grooves 1e, so that leakage of light emitted from each light-emitting element 11 to an adjacent section can be reduced.

The size of the light-guiding plate 1 is appropriately selected according to the size of the liquid-crystal display device in the case in which the light-emitting module 100 is used for a backlight source for a liquid-crystal display device. The size of the light-guiding plate 1 is such that each side of the light-guiding plate 1 is, for example, in a range of about 1 cm to 200 cm, preferably about 3 cm to 30 cm, in the case of the light-guiding plate 1 having a plurality of recesses 1b. The light-guiding plate 1 can have a thickness in a range of about 0.1 mm to 5 mm, preferably 0.1 mm to 3 mm. The light-guiding plate 1 can have a shape such as a substantially rectangular or substantially circular shape in a plan view.

For the material of the light-guiding plate 1, a resin material such as thermoplastic resins including acrylic resins, polycarbonates, cyclic polyolefins, poly(ethylene terephthalate), and polyesters and thermosetting resins including epoxies and silicones or an optically transparent material such as glass can be used. A thermoplastic resin material is particularly preferable because efficient manufacture by injection molding is possible. Among these materials, polycarbonates, which are highly transparent and inexpensive, are preferable. In the manufacturing process, even a thermoplastic material with a low thermal resistance such as polycarbonates can be used for the light-guiding plate 1 of the light-emitting module 100 manufactured without being exposed to a high-temperature environment as with solder reflow.

The light-guiding plate 1 may be a single layer or may have a layered structure of a plurality of light-transmissive layers. In the case in which a plurality of light-transmissive layers are layered, a layer with a refractive index different from a reflective index of the plurality of light-transmissive layers, such as an air layer, is preferably disposed between any layers of the plurality of light-transmissive layers. With this structure, diffusion of light is facilitated, and the light-emitting module with reduced unevenness in luminance may be obtained. Such a structure may be obtained by, for example, disposing a spacer between any light-transmissive layers of the plurality of light-transmissive layers to separate the corresponding light-transmissive layers such that an air layer is provided the corresponding light-transmissive layers.

Alternatively, a light-transmissive layer may be disposed on the first main surface 1c of the light-guiding plate 1, and a layer with a different refractive index, such as an air layer, may be disposed between the first main surface 1c of the light-guiding plate 1 and the light-transmissive layer. With this structure, diffusion of light is facilitated, and the liquid-crystal display device with reduced unevenness in luminance may be obtained. Such a structure can be achieved by, for example, disposing a spacer between a light-guiding plate 1 and the light-transmissive layer to separate from each other such that an air layer is provided.

Recess 1b

The light-guiding plate 1 has the recesses 1b on the second main surface 1d. Each light-emitting element unit 3 is disposed in a respective one of the recesses 1b such that the light-transmissive member 10 faces the bottom surface of the recess 1b.

The inner lateral surfaces of the recess 1b are larger than the outer lateral surfaces of the light-emitting element unit 3 in a plan view. Specifically, the inner lateral surfaces of the recess 1b are located outside the outer lateral surfaces of the light-emitting element unit 3 as shown in FIGS. 3A and 3B.

In a plan view of the light-guiding plate 1, the recess 1b has a quadrangular inner shape, and the light-emitting element unit 3 to be disposed in the recess 1b also has a quadrangular outer shape. Each outer lateral surface of the quadrangular light-emitting element unit 3 disposed in the quadrangular recess 1b can be parallel to a corresponding inner lateral surface of the recess 1b facing the outer lateral surface, but this structure is not limiting as described below.

The size of the recess 1b in a plan view can be appropriately changed according to the outer shape of a corresponding light-emitting element unit 3. The size of the recess 1b in a plan view can be such that, for example, its diameter in the case of a circular shape, its major axis in the case of an elliptic shape, or the length of its diagonal in the case of a quadrangular shape is in a range of 0.05 mm to 10 mm, preferably 0.1 mm to 2 mm. The depth of the recess 1b can be in a range of 0.05 mm to 4 mm, preferably 0.1 mm to 1 mm.

The recess 1b may have, for example, a substantially rectangular or substantially circular shape in a plan view, and the shape can be selected according to the intervals between the recesses 1b and the like. In the case in which the intervals (distance between the centers of two closest recesses 1b) of the recesses 1b are substantially equal, it is preferable that each of the recesses 1b have a substantially circular or substantially square shape. Among these shapes, with a substantially circular shape, spread of light emitted from the light-emitting element unit 3 can be increased.

The recess 1b may more preferably have such a height from the bottom surface of the recess 1b to the second main surface 1d that the main light-emitting surface 11c of the light-emitting element 11 and the second main surface 1d are substantially in the same plane in a cross-sectional view as shown in FIGS. 3A and 3B. The recess 1b may have a height that allows the upper surface of the light-emitting element 11 to be located at a position higher than the second main surface 1d when the light-emitting element 11 is mounted in the recess 1b. In this structure, the light-emitting element 11 is protruded from the recess 1b, so that the wiring operation of the electrodes 11b and the like can be facilitated. The height of the recess 1b is preferably adjusted according to the height of the light-emitting element 11 as described above.

Bonding Member 14

Each bonding member 14 is a light-transmissive member and is in contact with the inner lateral surfaces of the recess 1b and the outer lateral surfaces of the light-emitting element unit 3. Each bonding member 14 is disposed in contact with a portion of the first light-reflective member 15 located outside the recess 1b, in other words, disposed so as to cover a region covering the outer lateral surfaces of the light-transmissive member 10 and the outer lateral surfaces of the first light-reflective member 15.

Further, the outer lateral surfaces of the bonding member 14 are inclined surfaces 14a. The inclined surfaces 14a each make an acute inclination angle α with the outer lateral surface of the first light-reflective member 15. With the bonding member 14 having the inclined surfaces 14a, light transmitted through the bonding member 14 and incident on the inclined surfaces 14a can be uniformly reflected toward the light-emitting surface. Each bonding member 14 may also be disposed between the corresponding light-transmissive member 10 and the bottom surface of the corresponding recess 1b.

Further, the bonding member 14 is in contact with the second main surface 1d of the light-guiding plate 1. This structure increases the region in which the inclined surfaces 14a are formed and the amount of light to be reflected, so that unevenness in luminance can be reduced. The inclination angle α formed by the inclined surface 14a of the bonding member 14 and the outer lateral surface of the first light-reflective member 15 can be in a range of 5° to 85°, preferably 5° to 50°, more preferably 100 to 45°.

Each bonding member 14 fills the gap between the inner lateral surfaces of the recess 1b and the outer lateral surfaces of the light-emitting element unit 3 inside the recess 1b and is widened toward the second main surface 1d of the light-guiding plate 1 such that a bottom portion of the bonding member 14 is in contact with the second main surface 1d of the light-guiding plate 1. A width dl between each outer lateral surface of the light-emitting element unit 3 and a corresponding inner lateral surface of the recess 1b varies according to the inner diameter of the recess Tb, the outer diameter of the light-emitting element unit 3, their shapes, the orientation of the light-emitting element unit 3 when mounted in the recess Tb, the tolerances of the mounting position of the light-emitting element unit 3, and the like. Further, the inclination angle α also varies according to the height of the bonding member 14, that is, the height of the light-emitting element unit 3 (the height of the light-emitting element 11 and the thickness of the light-transmissive member 10) and the depth (height) of the recess 1b. Hence, the inclination angle α, which is formed by the inclined surface 14a of the bonding member 14 and the outer lateral surface of the first light-reflective member 15 and be widened toward the second main surface 1d, is selected according to these conditions.

A light-transmissive thermosetting resin material such as epoxy resins and silicone resins can be used for the bonding member 14. The light transmittance of the bonding member 14 is 60% or more, preferably 90% or more. The bonding member 14 may contain a diffusing material or the like or may contain white powder or the like, which is a light-reflective additive. Alternatively, the bonding member 14 may be made of only a light-transmissive resin material containing no diffusing material or white powder.

Optical Functional Portion 1a

The light-guiding plate 1 can have, on the first main surface 1c, optical functional portions 1a that have the functions of reflecting and diffusing light emitted from the light-emitting element units 3. The light-guiding plate 1 allows light emitted from the light-emitting element units 3 to spread out in the lateral direction, so that the emission intensity in the plane of the light-guiding plate 1 can be uniform. The optical functional portions 1a can have the function of, for example, allowing light to spread out in the plane of the light-guiding plate 1.

For example, each optical functional portion 1a is a conical recess (see FIGS. 3A and 3B and FIG. 13), a pyramidal recess such as a quadrangular pyramidal recess and a hexagonal pyramidal recess, a truncated conical recess (see FIG. 14), or a truncated pyramidal recess formed on the first main surface 1c. This structure allows incident light to be reflected at the interface between the inclined surface of the recess and a material with a refractive index different from a refractive index of the light-guiding plate 1 (such as air) inside the optical functional portion 1a, in a lateral direction of the light-emitting element unit 3.

For example, the optical functional portion 1a may have a recess that is defined by the inclined surface and provided with a light-reflective material (such as a white resin and a reflective film made of metal).

Further, the depth of the recess, which is the optical functional portion 1a, is selected in consideration of the depth of the recess 1b described above. That is, the optical functional portion 1a and the recess 1b can have any appropriate depth such that the optical functional portion 1a and the recess 1b can be separated from each other.

As described below, the optical functional portion 1a is preferably disposed at a position corresponding to each light-emitting element unit 3, in other words, at a position opposite to the light-emitting element unit 3 disposed on the second main surface 1d. In particular, it is preferable that the optical axis of the light-emitting element unit 3 substantially coincide with the central axis of the optical functional portion 1a.

This allows the center of the optical functional portion 1a formed on the first main surface 1c to coincide with the center of the bottom surface of the recess 1b formed on the second main surface 1d. In this structure, disposing the light-emitting element unit 3 at the center of the recess 1b allows the optical axis of the light-emitting element unit 3 to easily coincide with the central axis of the optical functional portion 1a. The size of the optical functional portion 1a can be appropriately selected.

With the structure in which the light-guiding plate 1 has a plurality of recesses 1b and a plurality of optical functional portions 1a and each of the light-emitting element units 3 is disposed in a respective one of the recesses 1b, both of the light-emitting element units 3 and the optical functional portions 1a can be arranged with high positional accuracy. Accordingly, with the optical functional portions 1a, light emitted from the light-emitting elements 11 is uniform with accuracy, so that a high-quality backlight source with small unevenness in luminance and color can be obtained.

In the light-guiding plate 1, disposing the optical functional portions 1a at positions of the recesses 1b in which the light-emitting element units 3 are disposed facilitates alignment of the light-emitting elements 11 with the optical functional portions 1a and prevents misalignment.

In the light-emitting module 100 in which a plurality of light-emitting element units 3 are disposed on the light-guiding plate 1 having a plurality of recesses b, the light-emitting element units 3 are two-dimensionally arranged in a plan view of the light-guiding plate 1. The light-emitting element units 3 are preferably disposed in the recesses 1b two-dimensionally arranged along two perpendicular directions, or the x direction and the y direction, as shown in FIG. 1.

Intervals px in the x direction and intervals py in the y direction between the recesses 1b in which the light-emitting element units 3 are disposed may be same as in the example shown in FIG. 1 or may be different from each other. The two directions of the arrangement do not necessarily have to be perpendicular to each other.

The intervals in the x and y directions are not limited to regular intervals but may be irregular intervals. For example, the recesses 1b, in each of which a respective one of the light-emitting element units 3 is disposed, may be arranged such that the intervals increase from the center of the light-guiding plate 1 toward its periphery. The statement "intervals between the light-emitting element units 3 disposed in the recesses b" refers to distances between the optical axes of the light-emitting element units 3, that is, the distances between the centers of the light-emitting element units 3.

Second Light-Reflective Member 16

The second light-reflective member 16 covers a portion of the second main surface 1d of the light-guiding plate 1 and a portion of the light-emitting element units 3. Specifically, the second light-reflective member 16 covers the second main surface 1d of the light-guiding plate 1, the inclined surfaces 14a of the light-transmissive bonding members 14, and a portion of the outer lateral surfaces of the first light-reflective members 15 not covered with the bonding members 14.

The second light-reflective member 16 reflects light emitted from the light-emitting elements 11 and light entering the light-guiding plate 1 to guide the light toward the first main surface 1e serving as the light-emitting surface for radiating light to the outside, so that the light extraction efficiency can be enhanced. Layering the second light-reflective member 16 on the light-guiding plate 1 reinforces the light-guiding plate 1. Further, with the second light-reflective member 16 serving as both of a member that protects the light-emitting elements 11 and a layer for reflecting light incident on the surface of the second main surface of the light guide plate 1, the thickness of the light-emitting module 100 can be reduced.

A material same as a material used for the first light-reflective member 15 described above, that is, a white resin in which a light-reflective additive such as white powder is added to a transparent resin, can be suitably used for the second light-reflective member 16. The second light-reflective member 16 effectively radiates light emitted from the light-emitting elements 11 to the outside through the first main surface 1*c* of the light-guiding plate 1.

As in the first light-reflective member 15, a white resin having a reflectance of 60% or more, preferably 90% or more, of light emitted from the light-emitting elements 11 is suitably used for the second light-reflective member 16. The white resin is preferably a resin containing a white pigment such as white powder. A silicone resin containing white inorganic powder such as titanium oxide is particularly preferable. A relatively large amount of a material is used for a member covering a surface of the light-guiding plate 1, so that using an inexpensive material such as titanium oxide at a high content for the member allows for reducing a price of the light-emitting module 100.

The first light-reflective member 15 and the second light-reflective member 16 may be collectively referred to as a light-reflective member 17.

Arrangement of Light-Emitting Element Units 3(1) and 3(2) and Wiring of Electrodes As shown in FIG. 2 and FIG. 3A, the light-emitting element units 3(1) and the light-emitting element units 3(2) are alternately arranged in the light-emitting module 100.

Specifically, the light-emitting elements 11(1) and the light-emitting elements 11(2) having light-emission characteristics different from the light-emission characteristics of the light-emitting elements 11(1) are alternately mounted such that the electrodes 11*b* face a direction opposite to the first main surface 1*c* (light-extracting surface) of the light-guiding plate 1. This arrangement can reduce unevenness in luminance of the light-emitting module 100. To further reduce unevenness in luminance of the light-emitting module 100, a diffusion layer may be disposed on the first main surface 1*c*, which serves as the light-emitting surface, of the light-guiding plate 1. Examples of the diffusion layer include a diffusion sheet made of a poly(methyl methacrylate) (PMMA) resin.

There is no particular limitation on the arrangement of the light-emitting elements 11(1) and the light-emitting elements 11(2), and a checkered pattern may be employed. The checkered pattern is particularly suitable in terms of reduction in unevenness in luminance of the light-emitting module 100.

Eight light-emitting elements 11(1) and eight light-emitting elements 11(2) are arranged in a four-by-four matrix in FIG. 2, but this arrangement is not limiting. The number of the light-emitting elements 11(1) and 11(2), the number of rows, and the number of columns can be appropriately selected according to the purpose.

The first light-reflective member 15 covers each of the light-emitting elements 11(1) and 11(2) such that the electrodes 11*b* of each light-emitting element 11(1) and the electrodes 11*b* of each light-emitting element 11(2) are exposed on a wiring formation surface 15*a*. A wiring formation surface 16*a* of the second light-reflective member 16 is continuous with the wiring formation surface 15*a*, the wiring formation surface 16*a* and the wiring formation surface 15*a* are substantially in the same plane.

The first wiring 5(1) connecting the electrodes 11*b* of the light-emitting elements 11(1) of the light-emitting element units 3(1) to each other and the second wiring 5(2) connecting the electrodes 11*b* of the light-emitting elements 11(2) of the light-emitting element units 3(2) to each other are formed on the wiring formation surfaces 15*a* and 16*a*.

Each of the first wiring 5(1) and the second wiring 5(2) is, for example, a layered film of Ni/Ru/Au layered in this order. In this case, for example, the Ni layer can have a thickness of about 2 to 8 nm, the Ru layer can have a thickness of about 9 to 15 nm, and the Au layer can have a thickness of about 22 to 28 nm. The materials and thicknesses of the first wiring 5(1) and the second wiring 5(2) described above are illustrative examples.

In FIG. 2, the first wiring 5(1) is indicated by dot patterns different from dot patterns of the second wiring 5(2) for convenience. The first wiring 5(1) is indicated by a dense dot pattern, while the second wiring 5(2) is indicated by a sparse dot pattern. That is, the light-emitting elements 11(1) of the light-emitting element units 3(1) are disposed in the portions indicated by the dense dot pattern, while the light-emitting elements 11(2) of the light-emitting element units 3(2) are disposed in the portions indicated by the sparse dot pattern.

Figure 4A:
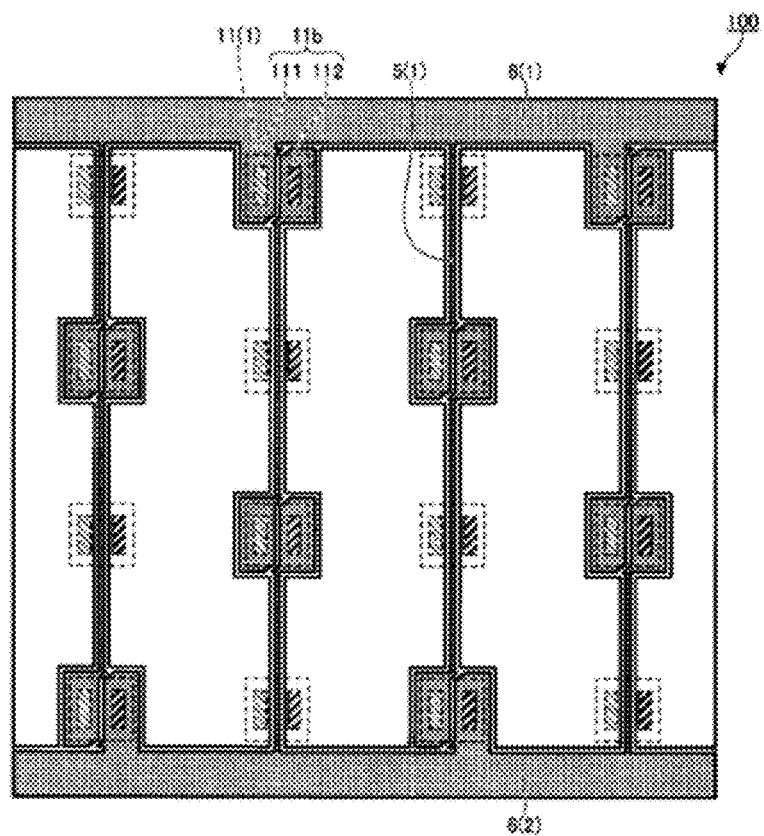
FIGS. 4A and 4B schematically show connection of first wiring 5(1) shown in FIG. 2.
Figure 4B:
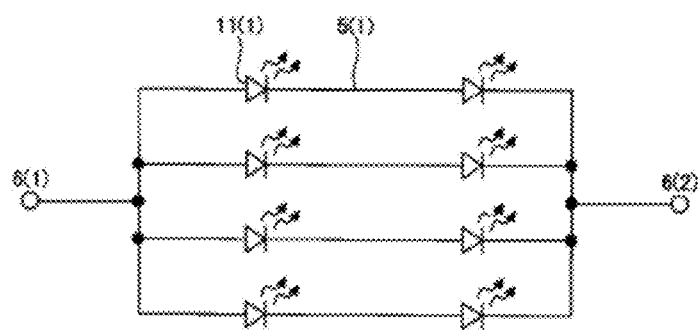

Only the first wiring 5(1) shown in FIG. 2 is indicated by the dot pattern in FIG. 4A, and FIG. 4B schematically shows the connection of the light-emitting elements 11(1) by the first wiring 5(1).

As shown in FIG. 4A, for example, a portion 6(1) of the first wiring 5(1) serves as an anode-side external connecting terminal, and a portion 6(2) of the first wiring 5(1) serves as a cathode-side external connecting terminal. In this case, four series circuits each containing two light-emitting elements 11(1) are connected in parallel as shown in FIG. 4B. When a predetermined voltage is applied between the anode-side external connecting terminal 6(1) and the cathode-side external connecting terminal 6(2), a current flows through each light-emitting element 11(1), and each light-emitting element 11(1) emits light.

Figure 5A:
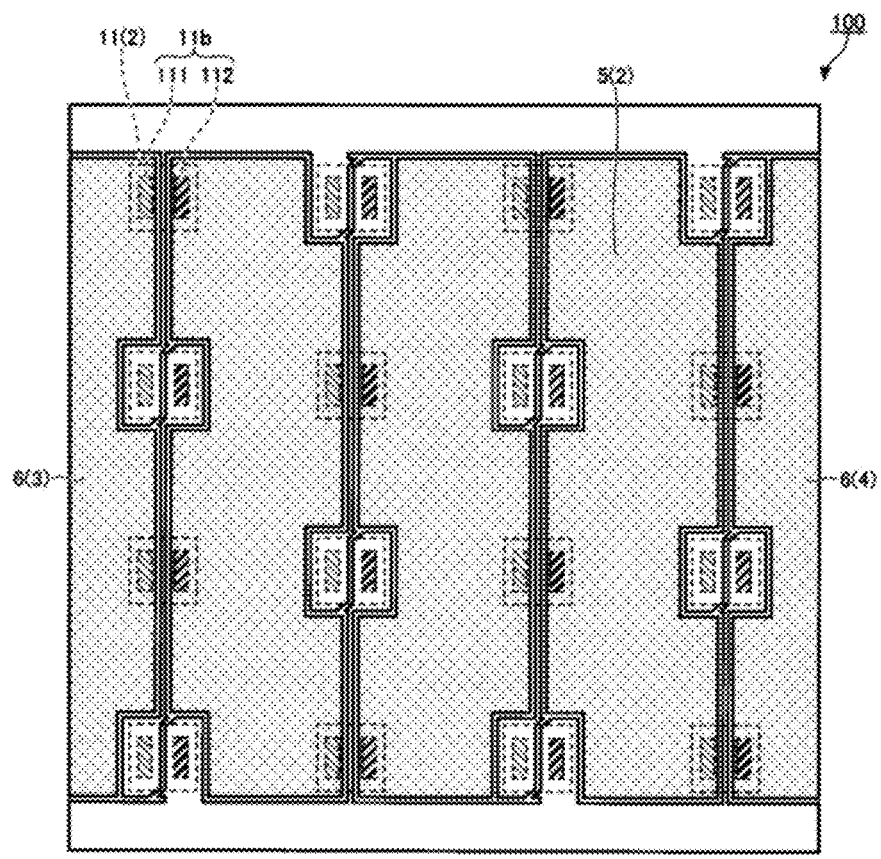
FIGS. 5A and 5B schematically show connection of second wiring 5(2) shown in FIG. 2.
Figure 5B:
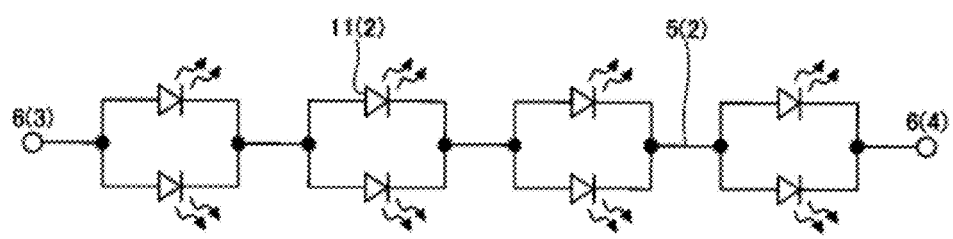

Only the second wiring 5(2) shown in FIG. 2 is indicated by the dot pattern in FIG. 5A, and FIG. 5B schematically shows the connection of the light-emitting elements 11(2) by the second wiring 5(2).

As shown in FIG. 5A, for example, a portion 6(3) of the second wiring 5(2) serves as an anode-side external connecting terminal, and a portion 6(4) of the second wiring 5(2) serves as a cathode-side external connecting terminal. In this case, four parallel circuits each containing two light-emitting elements 11(2) are connected in series as shown in FIG. 5B. When a predetermined voltage is applied between the anode-side external connecting terminal 6(3) and the cathode-side external connecting terminal 6(4), a current flows through each light-emitting element 11(2), and each light-emitting element 11(2) emits light.

In the light-emitting module 100, the light-emitting elements 11(1) and the light-emitting elements 11(2) may be turned on independently or at the same time.

For example, in the case in which the emission wavelengths of the light-emitting elements 11(1) are different from the emission wavelengths of the light-emitting elements 11(2), three emission colors can be provided by switching between three patterns composed of lighting of only the light-emitting elements 11(1), lighting of only the light-emitting elements 11(2), and lighting of the light-emitting elements 11(1) and the light-emitting elements 11(2) at the same time.

Alternatively, light control can be achieved by mixing daylight white and warm white instead of switching between the emission colors.

Alternatively, in the case in which the light-emitting elements 11(1) have the same emission wavelengths as the same emission wavelengths of the light-emitting elements 11(2), and the light-emitting elements 11(1) are low-luminance products while the light-emitting elements 11(2) are high-luminance products, a higher current may be allowed to flow through the light-emitting elements 11(1) than a current allowed to flow through the light-emitting elements 11(2). This allows for reducing unevenness in luminance.

Figure 6:
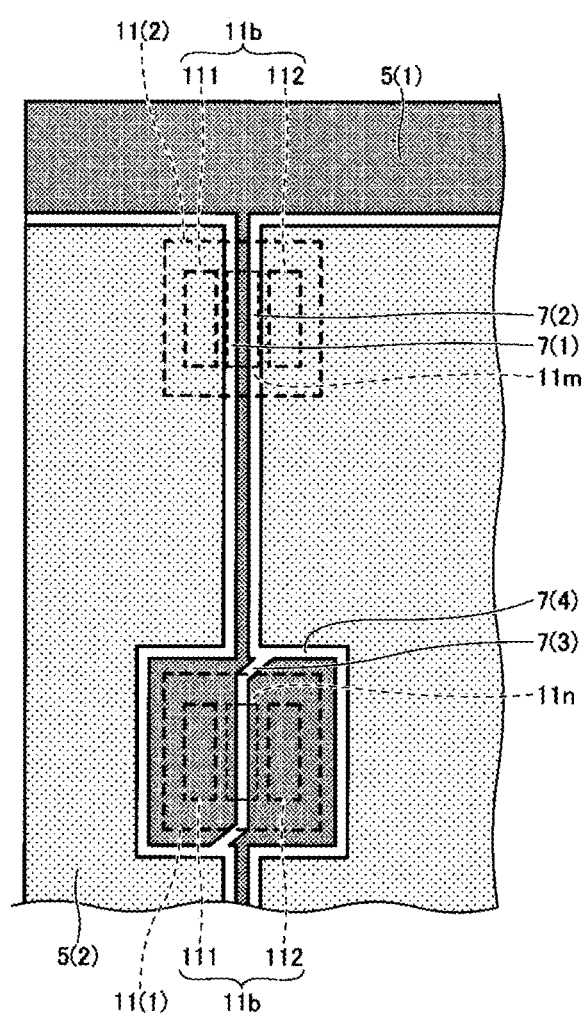
FIG. 6 is a schematic, partial, enlarged plan view of FIG. 2.

FIG. 6 is a schematic, partial, enlarged plan view of FIG. 2. As shown in FIG. 2 and FIG. 6, the first wiring 5(1) includes an interelectrode trace passing through an interelectrode region 11m between the anode electrode 111 and the cathode electrode 112 of the light-emitting element 11(2). While, the second wiring 5(2) does not include a trace passing through an interelectrode region In between the anode electrode 111 and the cathode electrode 112 of the light-emitting element 11(1).

FIG. 6 is a schematic enlarged view of a portion containing upper two light-emitting elements of the leftmost column in FIG. 2. The wiring is patterned in substantially the same way in the portion containing lower two light-emitting elements of the leftmost column in FIG. 2. The wiring is patterned in substantially the same way in the other columns.

With the first wiring 5(1) and the second wiring 5(2) patterned in this way, the electrodes 11b of the light-emitting elements 11(1) and 11(2) alternately arranged can be wired without using jumpers or through holes.

Fixed-width separation grooves 7(1) and 7(2) are formed on both sides of the interelectrode trace passing through the interelectrode region 11m. The separation groove 7(1) is parallel to the separation groove 7(2). There is no particular limitation on the widths of the separation grooves 7(1) and 7(2), and the widths are, for example, 10 μm or more and 30 μm or less.

The term "fixed-width" as used herein is not limited to the case in which the widths are completely uniform but includes the case in which the difference between the minimum width and the maximum width is 5 μm or less. The term "parallel" is not limited to the case of complete parallelism but includes the case in which the difference between the minimum interval and the maximum interval is 5 μm or less.

The separation groove 7(1) separates the second wiring 5(2) connected to the anode electrode 111 of the light-emitting element 11(2) from the interelectrode trace of the first wiring 5(1) passing through the interelectrode region 11m. The separation groove 7(2) separates the second wiring 5(2) connected to the cathode electrode 112 of the light-emitting element 11(2) from the interelectrode trace of the first wiring 5(1) passing through the interelectrode region 11m. There is no particular limitation on the width of the interelectrode trace of the first wiring 5(1) passing through the interelectrode region 11m, and the width is, for example, 30 μm or more and 100 μm or less.

The interelectrode trace passing through the interelectrode region 11m and the separation grooves 7(1) and 7(2) extend from the interelectrode region 11m of the light-emitting element 11(2) in a direction toward the adjacent light-emitting element 11(1) below the light-emitting element 11(2) in FIG. 6.

The separation groove 7(2) branches into two separation grooves 7(3) and 7(4) before the light-emitting element 11(1). The separation groove 7(3) passes through the interelectrode region 11n of the light-emitting element 11(1) and separates the first wiring 5(1) connected to the anode electrode 111 of the light-emitting element 11(1) from the first wiring 5(1) connected to the cathode electrode 112 of the light-emitting element 11(1).

The separation groove 7(1) passes outside the anode electrode 111 of the light-emitting element 11(1) and merges with the separation groove 7(3) passing through the interelectrode region 11n of the light-emitting element 11(1). The separation groove 7(4) passes outside the cathode electrode 112 of the light-emitting element 11(1).

This structure in which the first wiring 5(1) and the second wiring 5(2) are separated and insulated by a plurality of fixed-width separation grooves can be easily obtained by a processing method employing a laser described below referring to FIG. 10C and other drawings.

Manufacturing Process of Light-Emitting Module 100

FIGS. 7A to 7C and 8A to 8C are schematic diagrams illustrating a manufacturing process of light-emitting element units according to the first embodiment. Through steps shown in 7(a) to 7(c) and 8(a) to 8(c), the light-emitting element units 3 are provided.

Figure 7A:
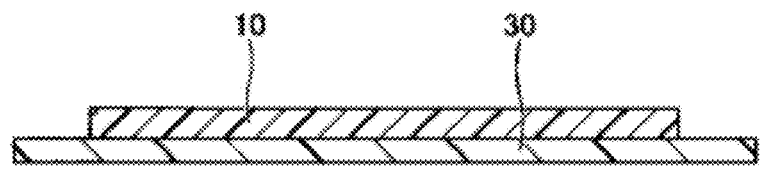
FIGS. 7A to 7C are first schematic diagrams illustrating a manufacturing process of light-emitting element units according to the first embodiment.
Figure 7B:
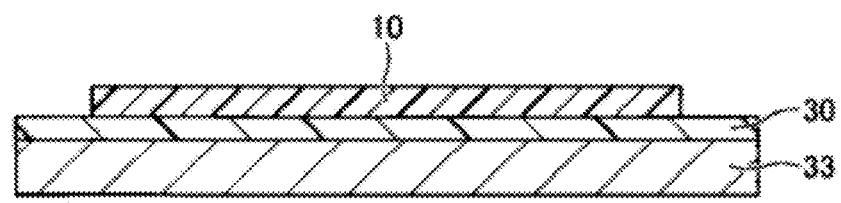

In the steps shown in FIG. 7A and FIG. 7B, the light-transmissive member 10 covering the main light-emitting surfaces 11c of the light-emitting elements 11 is formed.

First, in a step shown in FIG. 7A, the light-transmissive member 10 having a uniform thickness is disposed on the upper surface of a base sheet 30. Specifically, for example, the light-transmissive member 10 is releasably attached on the upper surface of the base sheet 30 with an adhesive layer therebetween.

Next, in a step shown in FIG. 7B, the structure shown in FIG. 7A is disposed on the upper surface of a plate 33 such that the lower surface of the base sheet 30 is brought into contact with the upper surface of the plate 33.

Figure 7C:
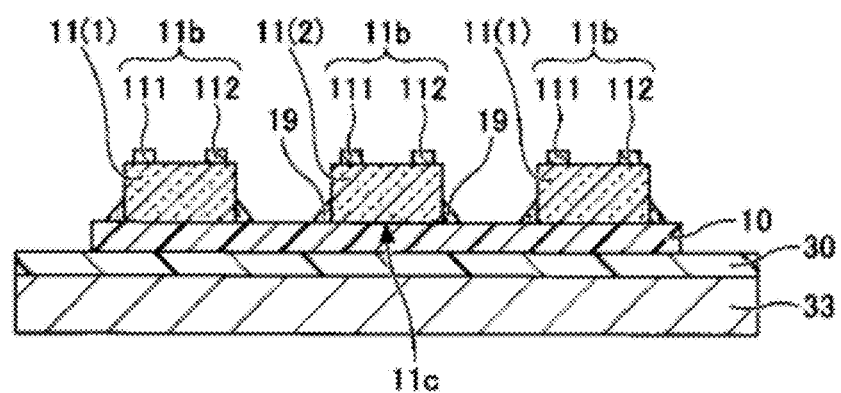

Next, in a step shown in FIG. 7C, a plurality of light-emitting elements 11(1) and a plurality of light-emitting elements 11(2) are alternately mounted on the light-transmissive member 10 such that the electrodes 11b face a direction opposite to the light-transmissive member 10. For example, the light-emitting elements 11(1) and the light-emitting elements 11(2) can be arranged in a checkered pattern. The main light-emitting surface 11c of the light-emitting elements 11 is bonded to the light-transmissive member 10.

The light-emitting elements 11(1) and 11(2) are bonded to the light-transmissive member 10 using the light-transmissive adhesive members 19. The light-transmissive adhesive members 19 are applied on the light-transmissive member 10 and/or on the main light-emitting surfaces 11c of the light-emitting elements 11(1) and 11(2) to bond the light-emitting elements 11(1) and 11(2) to the light-transmissive member 10. At this time, the applied light-transmissive adhesive members 19 creep up the lateral surfaces of the light-emitting elements 11(1) and 11(2) to cover a portion of the lateral surfaces of the light-emitting elements 11(1) and 11(2) as shown in FIG. 7C. The light-transmissive adhesive members 19 may also be disposed between the light-transmissive member 10 and the main light-emitting surfaces 11c of the light-emitting elements 11(1) and 11(2).

Figure 8A:
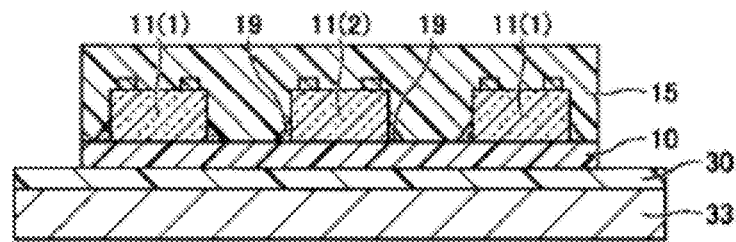
FIGS. 8A to 8C are second schematic diagrams illustrating the manufacturing process of the light-emitting element units according to the first embodiment.
Figure 8B:
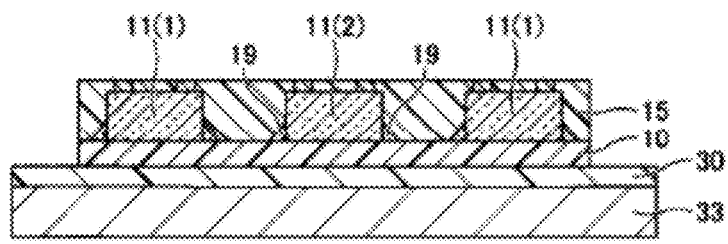
Figure 8C:
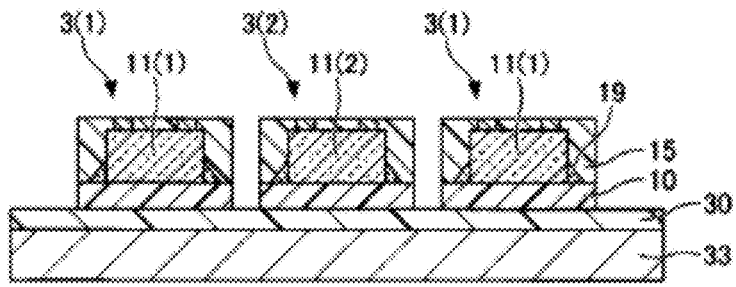

The gaps between the light-emitting elements 11(1) and the light-emitting elements 11(2) have dimensions that allow light-transmissive members 10 having an outer shape of a predetermined size to be obtained by performing cutting between the light-emitting elements 11(1) and the light-emitting elements 11(2), as shown in FIG. 8C. The gaps between the light-emitting elements 11(1) and the light-emitting elements 11(2) determine the outer shapes of the light-transmissive members 10.

Next, in a step shown in FIG. 8A, the first light-reflective member 15 is formed to embed the light-emitting elements 11(1) and 11(2). The first light-reflective member 15 is preferably a white resin. The first light-reflective member 15 is disposed on the light-transmissive member 10 and hardened in a state where the first light-reflective member 15 embeds the light-emitting elements 11(1) and 11(2). The first light-reflective member 15 has such a thickness as to allow each of light-emitting elements 11(1) and 11(2) to be entirely embedded, that is, a thickness as to allow the electrodes 11b of each of the light-emitting elements 11(1) and 11(2) to be embedded in first light-reflective member 15 in FIG. 8A. The first light-reflective member 15 can be formed using a technique such as compression molding, transfer molding, and application.

Next, in a step shown in FIG. 8B, a portion of the hardened first light-reflective member 15 is removed to expose the electrodes 11b of the light-emitting elements 11(1) and 11(2). Further, electrode protective terminals, which are not shown in the drawings, may be formed using an electrically-conductive film on the electrodes 11b exposed from the first light-reflective member 15. In this case, the electrically-conductive film made of a material such as copper, nickel, and gold is disposed on the surface of the first light-reflective member 15 by sputtering or the like to be connected to the electrodes 11b, and then a portion of the electrically-conductive film is removed, so that the electrically-conductive film is layered on the electrodes 11b to serve as the electrode protective terminals for the light-emitting element units 3. Removal of the electrically-conductive film can be performed by, for example, dry etching, wet etching, or laser ablation.

Next, in a step shown in FIG. 8C, the first light-reflective member 15 and the light-transmissive member 10 are cut to perform singulation into the light-emitting element units 3(1) and 3(2). In the singulated light-emitting element units 3(1) and 3(2), the light-emitting elements 11(1) and 11(2) are bonded to the light-transmissive members 10. The first light-reflective members 15 are disposed around the light-emitting elements 11(1) and 11(2), and the electrodes 11b are exposed on the surface of the first light-reflective members 15.

To provide the light-emitting element units, all or some of the steps described above may be performed. Alternatively, the light-emitting element units may be purchased.

FIGS. 9A to 9C and 10A to 10C are schematic diagrams illustrating a manufacturing process of the light-emitting module according to the first embodiment. Each of the light-emitting element units 3 manufactured through the steps described above is bonded to a respective one of the recesses 1b of the light-guiding plate 1 in steps shown in FIG. 9A to FIG. 10C.

Figure 9A:
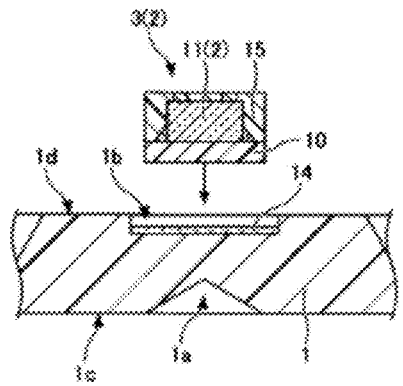
FIGS. 9A to 9C are first schematic diagrams illustrating a manufacturing process of the light-emitting module according to the first embodiment.
Figure 9B:
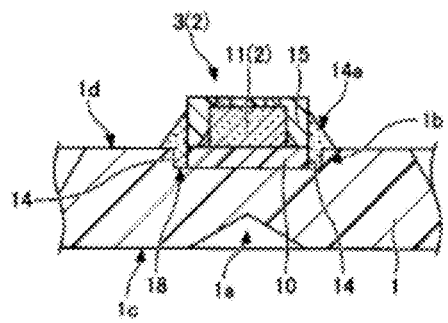

The light-guiding plate 1 having the recesses 1b on the second main surface 1d is first provided. For example, the light-guiding plate 1 is made of a thermoplastic resin such as a polycarbonate and has the recesses 1b on the second main surface 1d as shown in FIG. 9A and FIG. 9B.

The light-guiding plate 1 can be molded by, for example, injection molding, transfer molding, or compression molding. The light-guiding plate 1 can be mass-produced at a low cost while reducing misalignment of the recesses 1b by forming a material into a shape having the recesses 1b with a mold. The recesses may be formed by performing cutting with an NC processing machine or the like after the light-guiding plate 1 is formed into a plate. For example, the conical optical functional portions 1a may also be formed on the first main surface 1c.

Each of the light-emitting element units 3 is bonded to a respective one of the recesses 1b of the light-guiding plate 1. A portion of the light-emitting element unit 3 is disposed in the recess 1b in which the light-transmissive bonding member 14 in a liquid state has been applied. Specifically, the light-transmissive member 10 of the light-emitting element unit 3 faces the bottom surface of the recess 1b. The first light-reflective member 15 is located outside the recess 1b.

The light-emitting element unit 3 is disposed such that the center of the light-transmissive member 10 coincides with the center of the recess 1b in a plan view and is bonded to the light-guiding plate 1 by hardening the bonding member 14. The inner lateral surfaces of the recess 1b are larger than the outer lateral surfaces of the light-emitting element unit 3 in a plan view, which allows a clearance 18 between the inner lateral surfaces of the recess 1b and the outer lateral surfaces of the light-emitting element unit 3 to be formed when the light-emitting element unit 3 is disposed in the recess 1b. The clearance 18 is filled with the unhardened bonding member 14 applied in the recess 1b.

The amount of the bonding member 14 to be applied in the recess 1b is adjusted such that the bonding member 14 is squeezed out of the clearance 18 between the inner lateral surfaces of the recess 1b and the outer lateral surfaces of the light-emitting element unit 3 to the outside of the recess 1b. The bonding member 14 squeezed out of the recess 1b creeps up to have contact with a portion of the first light-reflective member 15 and to cover the portion of the first light-reflective member 15. Further, the bonding member 14 spreads to have contact with the second main surface 1d and covers a portion of the second main surface 1d, so that the upper surfaces of the bonding member 14 are the inclined surfaces 14a inclined outward from the upper end portion of the light-emitting element unit 3 in a vertical cross-sectional view. Each of the inclined surfaces 14a of the bonding member 14 make an acute angle with a corresponding outer lateral surface of the first light-reflective member 15. The inclination angle α is preferably in a range of 5° to 50°.

The amount of the bonding member 14 to be applied in the recess 1b can be such that the bonding member 14 covering the outer lateral surface of the light-emitting element unit 3 reaches a position higher than a position of the second main surface 1d of the light-guiding plate 1, that is, such that the bonding member 14 overflows the recess 1b outward, when the light-emitting element unit 3 is bonded to the recess 1b. The amount of the bonding member 14 to be applied is adjusted such that the position at which the inclined surface 14a of the bonding member 14 has contact with the outer lateral surface of the first light-reflective member 15 is below the edge of the outer lateral surface of the light-emitting element unit 3 on the electrode side.

Alternatively, after the light-emitting element unit 3 is bonded to the light-guiding plate 1, the unhardened bonding member 14 may be applied in the clearance 18 to cover a portion of the first light-reflective member 15. In other words, the bonding member 14 is applied so that the bonding member 14 is accommodated in the recess 1b when the light-emitting element unit 3 is disposed in the recess 1b. After that, the bonding member 14 is further applied to cover the outer lateral surfaces of the light-emitting element unit 3, specifically the outer lateral surfaces of the first light-reflective member 15. At this time, the amount of the bonding member 14 to be applied is adjusted such that the outer lateral surfaces of the light-emitting element unit 3 are not entirely covered. It is more preferable that the bonding member 14 be applied such that the bonding member 14 covers a portion of the second main surface 1d of the light-guiding plate 1.

Figure 9C:
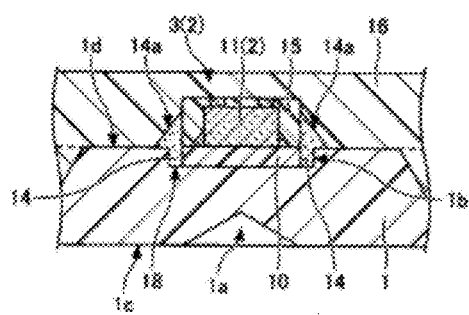

After the light-emitting element unit 3 is disposed in the light-guiding plate 1, the second light-reflective member 16 is formed on the second main surface 1d of the light-guiding plate 1 in a step shown in FIG. 9C. The second light-reflective member 16 has such a thickness as to allow the light-emitting element unit 3 to be embedded in the second light-reflective member 16.

Figure 10A:
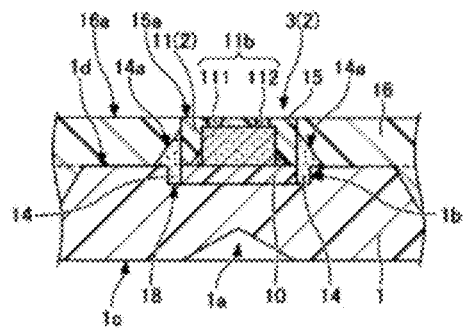
FIGS. 10A to 10C are second schematic diagrams illustrating the manufacturing process of the light-emitting module according to the first embodiment.

Next, in a step shown in FIG. 10A, a portion of the hardened second light-reflective member 16 is removed to expose the electrodes 11b on the surface of the second light-reflective member 16. The wiring formation surface 16a of the second light-reflective member 16 is continuous with the wiring formation surface 15a, and the wiring formation surface 16a and the wiring formation surface 15a are substantially in the same plane.

The second light-reflective member 16 is formed to have such a thickness as to allow the light-emitting element unit 3 to be embedded in the second light-reflective member 16 in a step shown in FIG. 9C, but the second light-reflective member 16 may be formed to have such a thickness that the surface of the second light-reflective member 16 and the surfaces of the electrodes 11b are in the same plane or the surface of the second light-reflective member 16 is located below the surfaces of the electrodes 11b to eliminate the removal step described above.

Figure 10B:
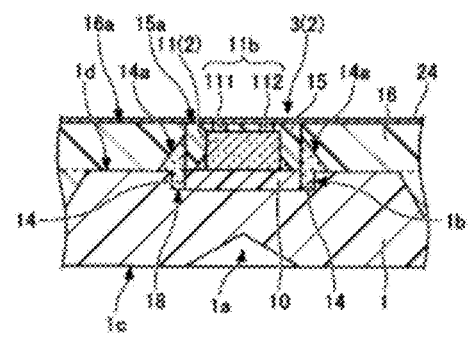

Next, in a step shown in FIG. 10B, a metal layer 24 is formed on the entire surface of the light-reflective member 17 (the wiring formation surface 15a of the first light-reflective member 15 and the wiring formation surface 16a of the second light-reflective member 16) including the surfaces of the electrodes 11b of the light-emitting element 11. For example, the metal layer 24 is formed by layering Ni/Ru/Au in this order by sputtering. In this case, for example, the Ni layer can have a thickness of about 2 to 8 nm, the Ru layer can have a thickness of about 9 to 15 nm, and the Au layer can have a thickness of about 22 to 28 nm. The materials and thickness of the metal layer 24 described above are illustrative examples.

Instead of sputtering, the metal layer 24 may be formed by vapor deposition, atomic layer deposition (ALD), metal organic chemical vapor deposition (MOCVD), plasma-enhanced chemical vapor deposition (PECVD), atmospheric-pressure plasma-enhanced chemical vapor deposition, or the like.

Figure 10C:
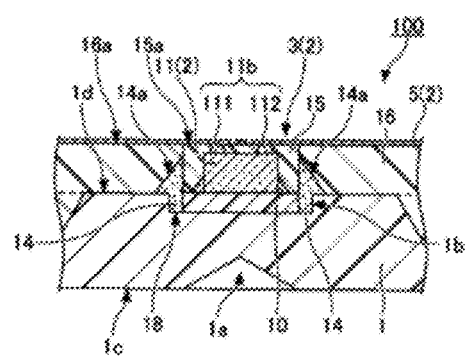

Next, in a step shown in FIG. 10C, a portion of the metal layer 24 is removed using a laser to form the first wiring 5(1) connecting the electrodes 11b of the light-emitting elements 11(1) and the second wiring 5(2) connecting the electrodes 11b of the light-emitting elements 11(2).

Irradiating the metal layer 24 with laser light causes, for example, laser ablation, so that a portion of the metal layer 24 is removed. Laser ablation is a phenomenon that the surface of a solid is removed when the radiation intensity of laser light applied on the surface of the solid reaches or exceeds a certain magnitude (threshold). The metal layer 24 can be patterned by laser ablation without a mask or the like.

The laser light can be applied to the metal layer 24 by continuously or successively moving its irradiation spot on the metal layer 24. Continuous or pulsed laser light may be applied. The intensity, the diameter of the irradiation spot, and the moving speed of the irradiation spot of the laser light can be selected in consideration of thermal conductivities of the light-reflective member 17 and the metal layer 24 and the difference in their thermal conductivities so that laser ablation of the metal layer 24 on the light-reflective member 17 takes place. The diameter of the irradiation spot is preferably about 20 μm.

The wavelength of the laser light is preferably a wavelength at which the reflectance of the metal layer 24 is low. For example, a wavelength at which the reflectance is 90% or less is preferably selected. For example, in the case in which Au constitutes the outermost surface of the metal layer 24, a laser with an emission wavelength in the green range (such as 532 nm) or a laser with an emission wavelength in the ultraviolet range (such as 355 nm) shorter than the green range is preferred to a laser with an emission wavelength in the red range (such as 640 nm). This constitution can improve the efficiency of ablation and enhance mass production.

The angle of the laser that scans the portion between the electrodes 11b is preferably corrected according to the rotation at the time of mounting of the light-emitting element 11.

The step shown in FIG. 10C includes a step of forming, in the interelectrode region between the anode electrode 111 and the cathode electrode 112, the interelectrode trace included in the first wiring 5(1) and separating the second wiring 5(2) connected to the anode electrode 111 from the second wiring 5(2) connected to the cathode electrode 112 by forming two fixed-width separation grooves in the interelectrode region.

Through this step, the second wiring 5(2) connected to the anode electrode 111 is spaced apart from the second wiring 5(2) connected to the cathode electrode 112, and the first wiring 5(1) of another path is formed in the interelectrode region between the anode electrode 111 and the cathode electrode 112. The efficiency of the manufacturing process can thus be enhanced.

The light-emitting module 100 in which a plurality of light-emitting element units 3 are disposed on a single light-guiding plate 1 is manufactured through the above steps.

As described above, the light-emitting module 100 has the structure in which each of the first wiring 5(1) and the second wiring 5(2) is directly connected to a corresponding one of the electrodes 11b of the light-emitting elements 11(1) and 11(2) that have been mounted on the light-guiding plate 1. Accordingly, the requirement to mount the light-emitting elements 11(1) and 11(2) accurately can be relaxed compared with the structure disclosed in Japanese Unexamined Patent Application Publication No. 2014-229676 and the like in which electrodes of light-emitting elements are connected to wiring by flip-chip bonding.

In the light-emitting module 100, the light-emitting elements 11(1) and the light-emitting elements 11(2) that have light-emission characteristics different from light-emission characteristics of the light-emitting elements 11(1) are alternately mounted, so that unevenness in luminance can be reduced. In the light-emitting module 100, the light-emitting elements 11(1) and the light-emitting elements 11(2) having different light-emission characteristics are alternately mounted, which allows for switching between the emission colors and light control by mixing daylight white and warm white.

In the light-emitting module 100, the light-guiding plate 1 has the recesses b, and each of the light-emitting element units 3 is disposed in a respective one of the recesses b, so that the thickness of an entirety of the light-emitting module can be reduced. Further, with the light-guiding plate 1 having the recesses 1*b* in each of which a respective one of the light-emitting element units 3 is disposed, the accuracy in mounting of the light-emitting element units 3 on the light-guiding plate 1 is improved.

In particular, each of the light-emitting element units 3, in which the light-emitting element 11 is bonded to the light-transmissive member 10 to be an integrated structure, is disposed in a respective one of the recesses 1*b* of the light-guiding plate 1, so that the accuracy in mounting of the light-transmissive members 10 and the light-emitting elements 11 on the light-guiding plate 1 is improved. This allows for improving light-emission characteristics.

In the light-emitting module 100 in which light emitted from the light-emitting elements 11 is transmitted through the light-transmissive members 10, guided to the light-guiding plate 1, and radiated to the outside, the light-emitting elements 11, the light-transmissive members 10, and the light-guiding plate 1 can be accurately arranged. Accordingly, light-emission characteristics such as unevenness in emission color and unevenness in luminance of light radiated from the light-guiding plate 1 to the outside can be reduced, so that good light-emission characteristics can be obtained.

With the bonding member 14 in contact with the outer lateral surfaces of the light-transmissive member 10, the inner lateral surfaces of the light-guiding plate 1, and the first light-reflective member 15 located outside the recess Tb, light emitted from the light-transmissive member 10 toward the second light-reflective member 16 can be guided more laterally outward from the light-emitting element unit 3. The unevenness in luminance is thus is reduced. A larger amount of light emitted from the light-transmissive member 10 can be incident on the light-guiding plate 1, so that the light extraction efficiency can be enhanced.

First Modified Example of First Embodiment

In a first modified example of the first embodiment, a plurality of light-guiding plates each having a single recess in which a single light-emitting element unit is disposed are arranged in a planar manner. In the first modified example of the first embodiment, description of the same components as in the embodiment described above may be omitted.

Figure 11:
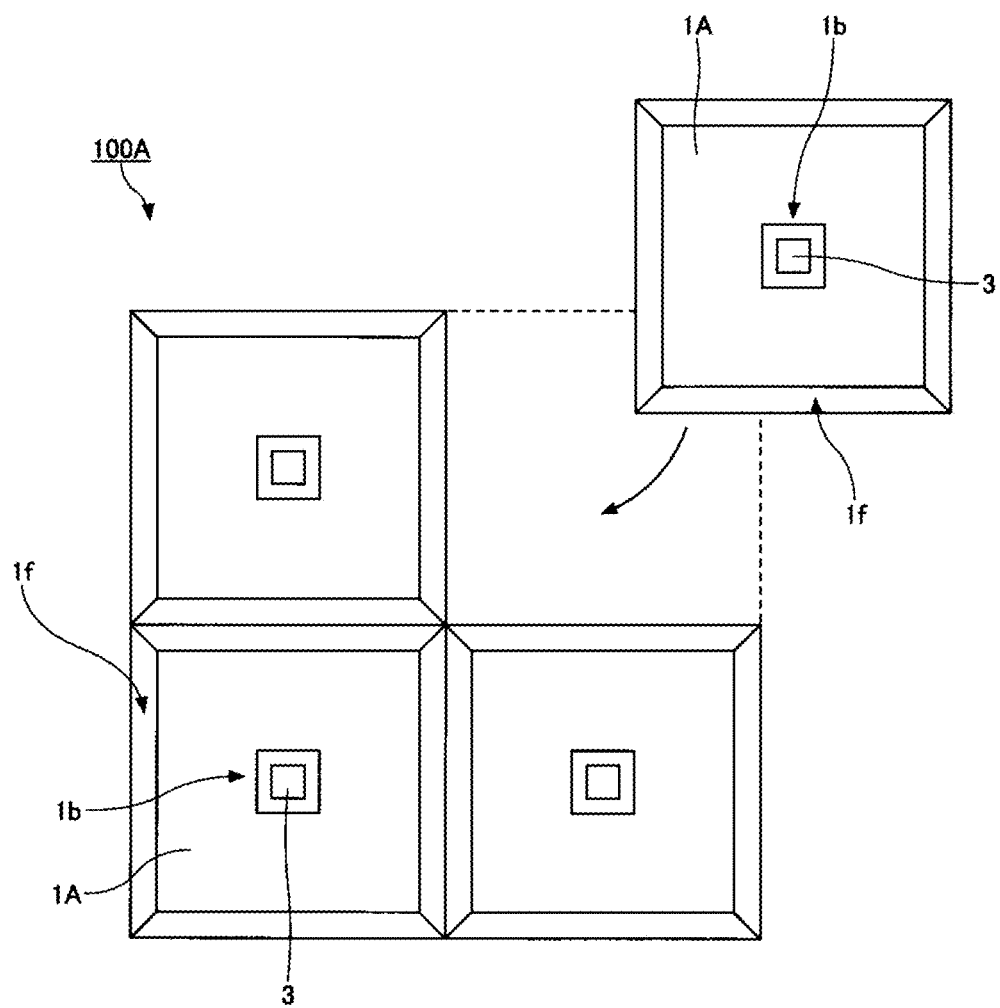
FIG. 11 is a first schematic bottom view of a light-emitting module according to a first modified example of the first embodiment.
Figure 12:
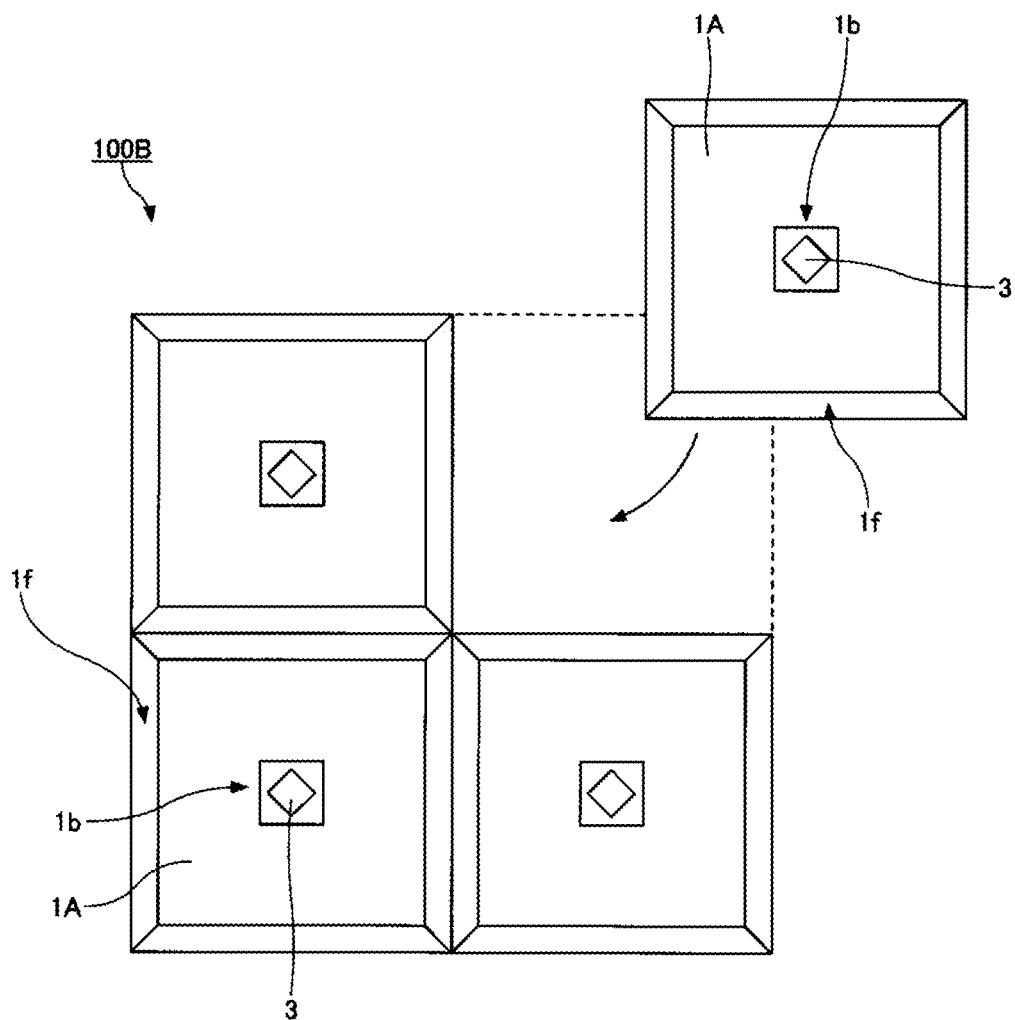
FIG. 12 is a second schematic bottom view of the light-emitting module according to the first modified example of the first embodiment.

FIG. 11 is a first schematic bottom view of a light-emitting module according to the first modified example of the first embodiment. FIG. 12 is a second schematic bottom view of the light-emitting module according to the first modified example of the first embodiment.

As in a light-emitting module 100A shown in FIG. 11, a plurality of light-guiding plates 1A each having a single recess 1*b* in which a single light-emitting element unit 3 is disposed may be arranged in a planar manner. In this case, the light-guiding plate TA may have inclined surfaces if inclined toward the peripheral edges on the periphery of the second main surface 1*d*.

The second light-reflective member 16 is disposed on the surfaces of the inclined surfaces 1*f*. The second light-reflective member 16 bonded to the inclined surfaces if prevents leakage of light to the surroundings of the light-guiding plate TA, so that reduction in the intensity of light emitted from the first main surface 1*c* of the light-guiding plate TA can be prevented.

In the light-guiding plate TA, for example, the recess 1*b* has a quadrangular inner shape, and the light-emitting element unit 3 to be disposed in the recess 1*b* also has a quadrangular outer shape in a plan view. In this case, for example, each outer lateral surface of the light-emitting element unit 3 can be parallel to a corresponding inner lateral surface of the recess 1*b* facing the outer lateral surface as shown in FIG. 11.

It is preferable that each outer lateral surface of the light-emitting element unit 3 be rotated 45° relative to a corresponding inner lateral surface of the recess Tb, as in a light-emitting module 100B shown in FIG. 12. In the light-emitting modules 100A and 100B, it is preferable that the center of the bottom surface of the recess Tb substantially coincide with the center of the light-emitting element unit 3 in a plan view. This structure allows the distances from the lateral surfaces of the light-emitting element unit 3 to corresponding inner lateral surfaces of the recess Tb to be uniform, so that unevenness in emission color of the light-emitting modules 100A and 100B can be reduced.

As described above, the light-emitting element unit 3 having a quadrangular outer shape may be disposed such that each side intersects with the corresponding side of the quadrangular recess Tb, in other words, such that the light-emitting element unit 3 is rotated relative to the quadrangular recess 1*b*. In the example shown in FIG. 12, the light-emitting element unit 3 is rotated 45° relative to the quadrangular recess 1*b* about the center of the light-emitting element unit 3.

Second Modified Example of First Embodiment

A second modified example of the first embodiment relates to the inclined surfaces 14*a* of the bonding member 14. In the second modified example of the first embodiment, description of the same components as in the embodiment described above may be omitted.

Figure 13:
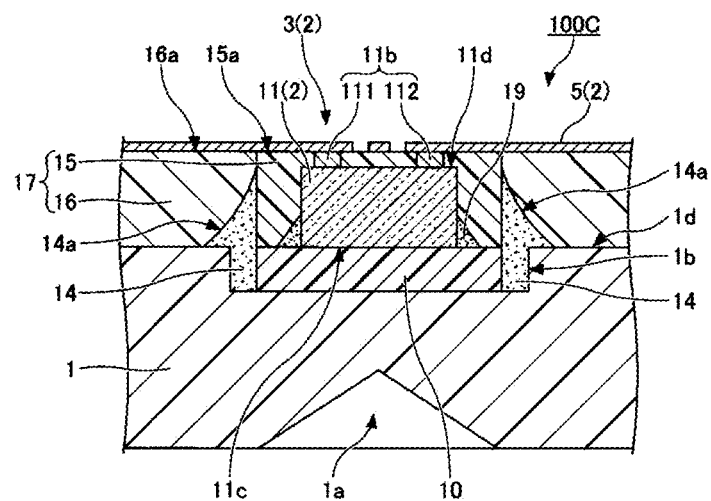
FIG. 13 is a first schematic enlarged cross-sectional view of a light-emitting module according to a second modified example of the first embodiment.
Figure 14:
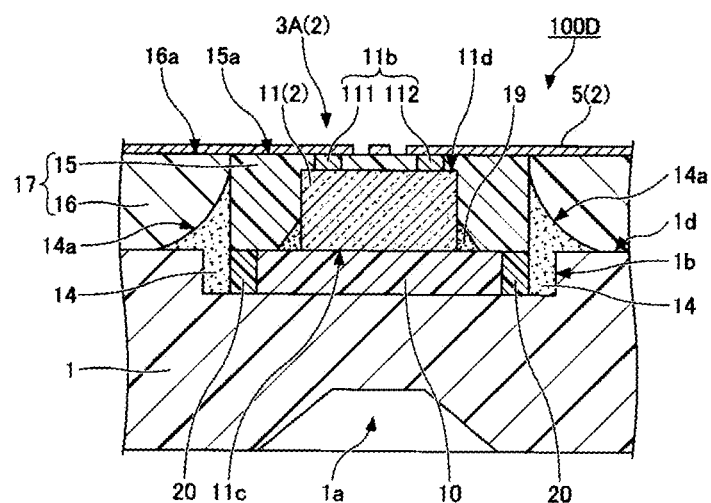
FIG. 14 is a second schematic enlarged cross-sectional view of the light-emitting module according to the second modified example of the first embodiment.
Figure 15:
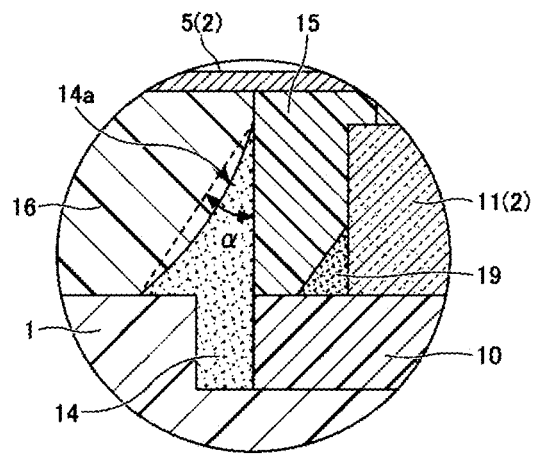
FIG. 15 is a first schematic enlarged cross-sectional view of the vicinity of an inclined surface 14a of the light-emitting module shown in FIG. 13.
Figure 16:
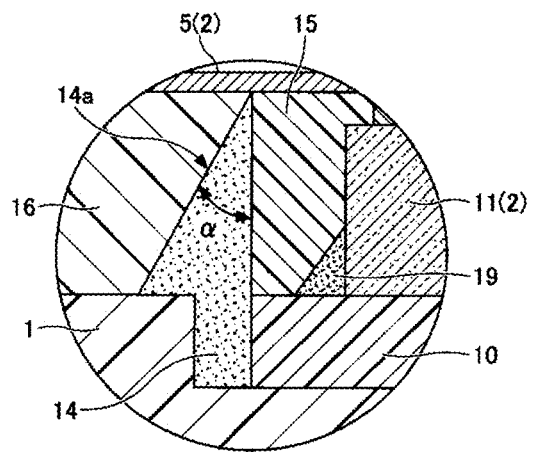
FIG. 16 is a second schematic enlarged cross-sectional view of the vicinity of the inclined surface 14a of the light-emitting module shown in FIG. 13.

FIG. 13 is a first schematic enlarged cross-sectional view of the vicinity of a light-emitting element unit 3 in a light-emitting module according to the second modified example of the first embodiment. FIG. 14 is a second schematic enlarged cross-sectional view of the vicinity of a light-emitting element unit 3A in the light-emitting module according to the second modified example of the first embodiment. FIG. 15 is a first schematic enlarged cross-sectional view of the vicinity of an inclined surface 14*a* of the light-emitting module shown in FIG. 13. FIG. 16 is a second schematic enlarged cross-sectional view of the vicinity of the inclined surface 14*a* of the light-emitting module shown in FIG. 13.

As in a light-emitting module 100C shown in FIG. 13 and a light-emitting module 100D shown in FIG. 14, the inclined surface 14*a* of the light-transmissive bonding member 14 can be a curved surface in a cross-sectional view. The light-emitting element unit 3A shown in FIG. 14 differs from the light-emitting element unit 3 shown in FIG. 13 in that a light-transmissive resin member 20 is further included on the outer lateral surfaces of the light-transmissive member 10.

In the case in which the inclined surface 14*a* is a curved surface, the inclination angle α is defined as the angle between the outer lateral surface of the first light-reflective member 15 and the straight line (indicated by a dashed line in FIG. 15) connecting the upper end of the inclined surface 14*a* of the bonding member 14 covering the outer lateral surface of the first light-reflective member 15 and the periphery of a portion of the second main surface 1*d* of the light-guiding plate 1 covered with the inclined surface 14*a*, as shown in FIG. 15.

In the light-emitting module 100C shown in FIG. 13 and the light-emitting module 100D shown in FIG. 14, the inclined surface 14*a* of the bonding member 14 is a convex curved surface protruding toward the recess 1*b*. The directions of travel of light reflected at the inclined surface 14*a* can thus vary, and unevenness in luminance can be reduced.

Further, the inclined surface 14*a* of the bonding member 14 in the light-emitting module 100D shown in FIG. 14 covers a portion of the second main surface 1*d* of the light-guiding plate 1 such that an outer periphery of the inclined surface 14*a* is located at a position outer than an outer periphery of the inclined surface 14*a* shown in FIG. 13. It is preferable that the bonding member 14 cover a greater area of the second main surface 1*d* in a cross-sectional view. This structure allows for increasing the area of the inclined surface 14*a*, so that reflection of light may be increased. In the case in which a single light-guiding plate 1 is provided with a plurality of light-emitting element units 3, it is preferable that each bonding member 14 do not have contact with the bonding member 14 covering an adjacent light-emitting element unit 3.

In the light-emitting module 100C shown in FIG. 13 and the light-emitting module 100D shown in FIG. 14, the inclined surfaces 14*a* may cover the entire outer lateral surfaces of the first light-reflective member 15 as shown in FIG. 16. That is, in the examples shown in FIG. 13 and FIG. 14, the inclined surface 14*a* covers a portion of the outer lateral surface of the first light-reflective member 15 other than the upper portion of the outer lateral surface, but the upper end of the inclined surface 14*a* may be located at the upper end of the first light-reflective member 15 as shown in FIG. 16.

The structure shown in FIG. 16 allows light traveling in the lateral direction of the light-emitting element unit to be also reflected at the inclined surface 14*a* and the most of the light to be used, so that light can be further spread out. There may be leakage of light from the upper portion of the first light-reflective member 15 covered with the bonding member 14 that has crept up the first light-reflective member 15. However, the present light-emitting module includes the first wiring 5(1) or the second wiring 5(2) disposed above the first light-reflective member 15, and leakage of light can therefore be reduced using reflection at the first wiring 5(1) or the second wiring 5(2).

Also in the case in which the inclined surface 14*a* is not a curved surface in a cross-sectional view as shown in FIGS. 3A and 3B and other drawings, covering the entire outer lateral surfaces of the first light-reflective member 15 with the inclined surfaces 14*a* in substantially the same manner as in the case shown in FIG. 16 has substantially the same effects as described above.

The light-emitting module 10D shown in FIG. 14 further includes the light-transmissive resin member 20 on the outer lateral surfaces of the light-transmissive member 10 of the light-emitting element unit 3A, so that the outer lateral surfaces of the light-transmissive member 10 can be protected in a step of singulation into the light-emitting units 3A. For example, a light-transmissive resin with a light transmittance of 60% or more, preferably 90% or more, can be used for the light-transmissive resin member 20. The first light-reflective member 15 of the light-emitting element unit 3A is in contact with the light-transmissive member 10 and the light-transmissive resin member 20.

For example, the light-emitting element unit 3A of the light-emitting module 100D shown in FIG. 14 is manufactured below. FIGS. 17A to 17D and 18A to 18C are schematic diagrams illustrating a manufacturing process of the light-emitting element units according to the second modified example of the first embodiment.

Figure 17A:
FIGS. 17A to 17D are first schematic diagrams illustrating a manufacturing process of light-emitting element units according to the second modified example of the first embodiment.

First, in a step shown in FIG. 17A, the light-transmissive members 10 having a uniform thickness are disposed on the upper surface of the base sheet 30. Specifically, for example, the light-transmissive members 10 are releasably attached on the upper surface of the base sheet 30 with an adhesive layer therebetween.

Figure 17B:
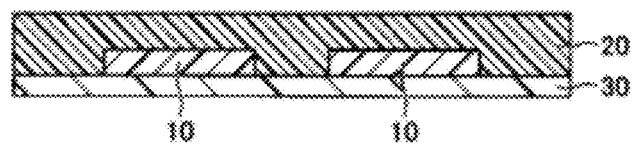

Next, in a step shown in FIG. 17B, the light-transmissive resin member 20 is formed on the upper surface of the base sheet 30 to embed the light-transmissive members 10. The light-transmissive resin member 20 covers and protects the outer lateral surfaces of the light-transmissive members 10.

Figure 17C:
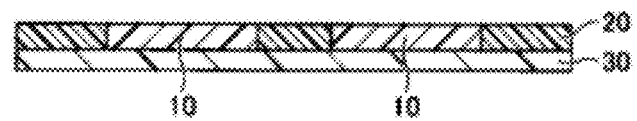

Next, in a step shown in FIG. 17C, a portion of the hardened light-transmissive resin member 20 is removed to expose the light-transmissive members 10 on the upper surface of the light-transmissive resin member 20.

Figure 17D:
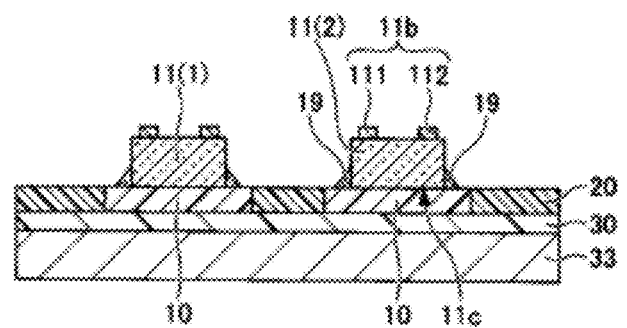

Next, in a step shown in FIG. 17D, the structure shown in FIG. 17C is disposed on the upper surface of the plate 33 such that the lower surface of the base sheet 30 is brought into contact with the upper surface of the plate 33. After that, each of a plurality of light-emitting elements 11(1) and each of a plurality of light-emitting elements 11(2) are alternately mounted on a respective one of the light-transmissive members 10 such that the electrodes 11*b* face a direction opposite to the light-transmissive members 10. For example, the light-emitting elements 11(1) and the light-emitting elements 11(2) can be arranged in a checkered pattern.

Specifically, the light-transmissive adhesive members 19 are applied on the light-transmissive members 10 and/or on the main light-emitting surfaces 11*c* of the light-emitting elements 11(1) and 11(2), and the main light-emitting surfaces 11*c* are bonded to the light-transmissive members 10. Each of the light-emitting elements 11(1) and 11(2) is bonded to a respective one of the light-transmissive member 10 such that the center of the main light-emitting surface 11*c* of the light-emitting element 11(1) or 11(2) substantially coincides with the center of the light-transmissive member 10 in a plan view.

Figure 18A:
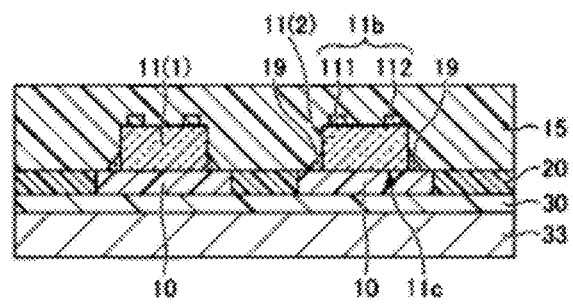
FIGS. 18A to 18C are second schematic diagrams illustrating the manufacturing process of light-emitting element units according to the second modified example of the first embodiment.

Next, in a step shown in FIG. 18A, the first light-reflective member 15 is formed to embed the light-emitting elements 11(1) and 11(2). The first light-reflective member 15 is disposed on the light-transmissive members 10 and the light-transmissive resin member 20 and hardened such that the first light-reflective member 15 embeds the light-emitting elements 11(1) and 11(2).

Figure 18B:
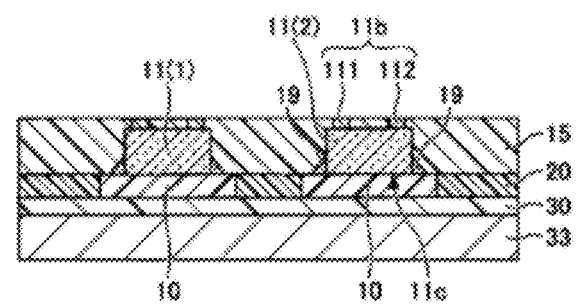

Next, in a step shown in FIG. 18B, a portion of the hardened first light-reflective member 15 is removed to expose the electrodes 11*b* of the light-emitting elements 11(1) and 11(2).

Figure 18C:
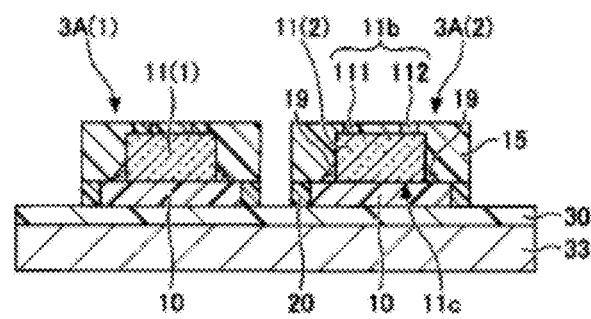

Next, in a step shown in FIG. 18C, the first light-reflective member 15 and the light-transmissive resin member 20 are cut to perform singulation into the light-emitting element units 3A(1) and 3A(2). In each of the singulated light-emitting element units 3A(1) and 3A(2), the light-transmissive member 10 that has the outer circumferential surface covered with the light-transmissive resin member 20 is bonded to the light-emitting element 11(1) or 11(2). Further, the first light-reflective member 15 is disposed around the light-emitting element 11(1) or 11(2), and the electrodes 11*b* are exposed on the surface of the first light-reflective member 15.

Each of the light-emitting element units 3A(1) and 3A(2) manufactured through the above steps is bonded to a respective one of the recesses 1*b* of the light-guiding plate 1 in substantially the same manner as in the above steps shown in FIG. 9A to FIG. 10C, and the second light-reflective member 16 covering the second main surface 1*d* of the light-guiding plate 1 and the light-emitting element units 3A(1) and 3A(2) is formed. The light-emitting module 100D is thus manufactured.

Third to Fifth Modified Examples of First Embodiment

Third to fifth modified examples of the first embodiment are modified examples of wiring connecting the electrodes of the light-emitting elements. In the third to fifth modified examples of the first embodiment, description of the same components as in the embodiment described above may be omitted.

Figure 19:
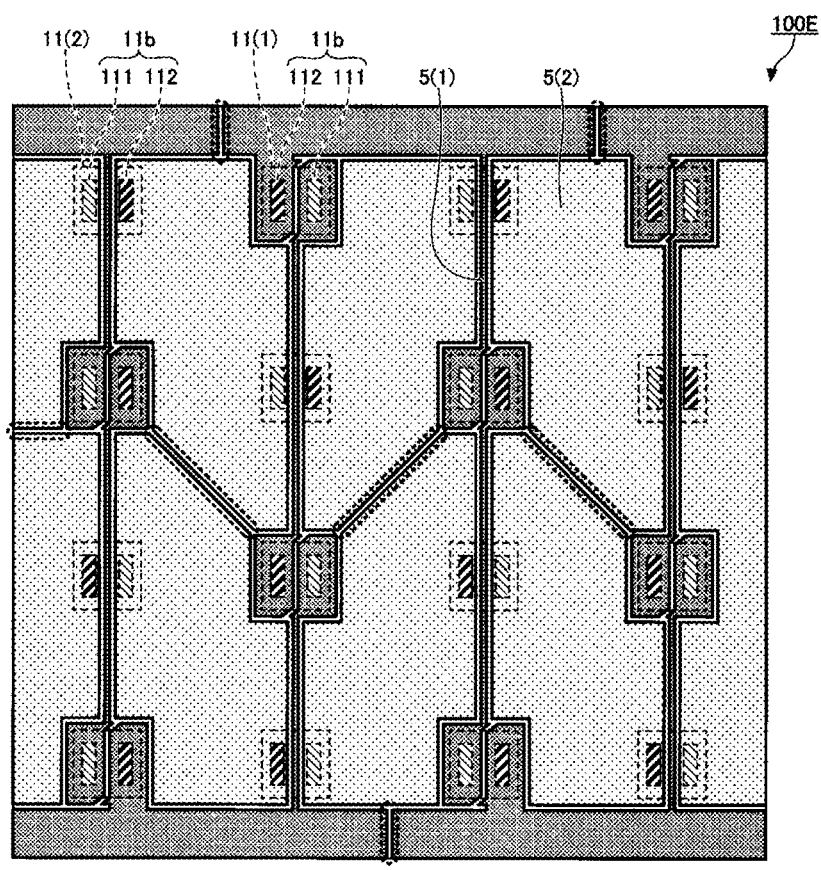
FIG. 19 is a schematic bottom view of an illustrative light-emitting module according to a third modified example of the first embodiment.
Figure 20A:
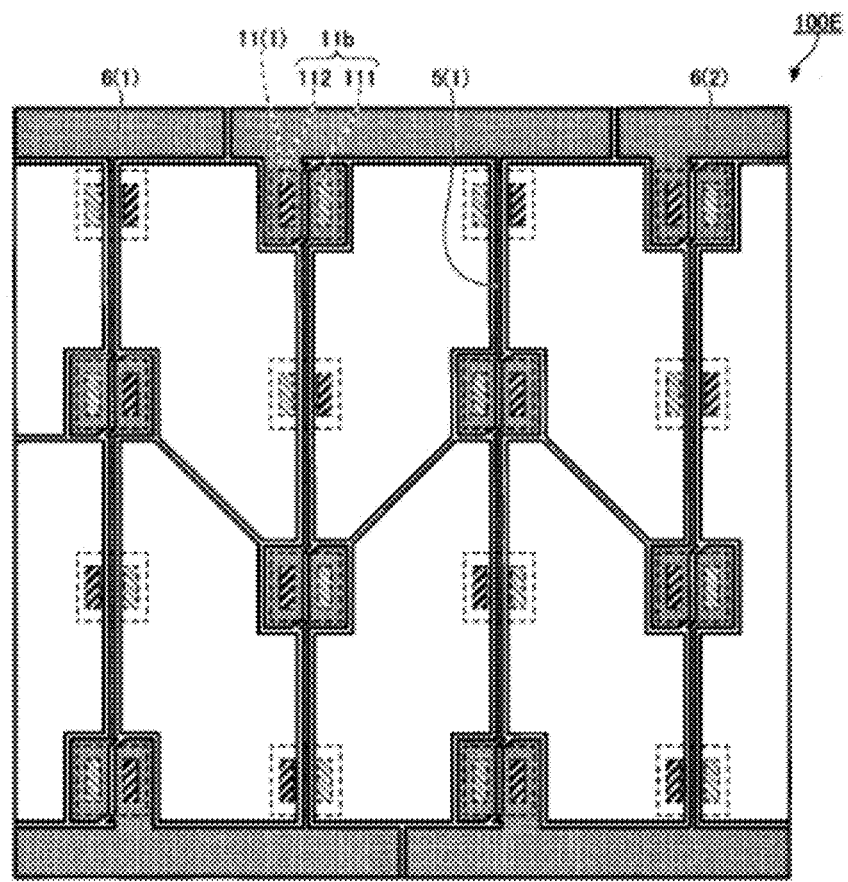
FIGS. 20A and 20B schematically show connection of first wiring 5(1) shown in FIG. 19.
Figure 20B:

FIG. 19 is a schematic bottom view of an illustrative light-emitting module according to the third modified example of the first embodiment. Only the first wiring 5(1) shown in FIG. 19 is indicated by the dot pattern in FIG. 20A, and FIG. 20B schematically shows the connection of the light-emitting elements 11(1) by the first wiring 5(1). Only the second wiring 5(2) shown in FIG. 19 is indicated by the dot pattern in FIG. 21A, and FIG. 21B schematically shows the connection of the light-emitting elements 11(2) by the second wiring 5(2).

In a light-emitting module 100E shown in FIG. 19, separation grooves enclosed by dashed lines are added to the light-emitting module 100 shown in FIG. 2. The circuit connection shown in FIG. 20A to FIG. 21B is thus provided.

As shown in FIG. 20A, for example, the portion 6(1) of the first wiring 5(1) serves as the anode-side external connecting terminal, and the portion 6(2) of the first wiring 5(1) serves as the cathode-side external connecting terminal. In this case, eight light-emitting elements 11(1) are connected in series as shown in FIG. 20B. When a predetermined voltage is applied between the anode-side external connecting terminal 6(1) and the cathode-side external connecting terminal 6(2), a current flows through each light-emitting element 11(1), and each light-emitting element 11(1) emits light.

Figure 21A:
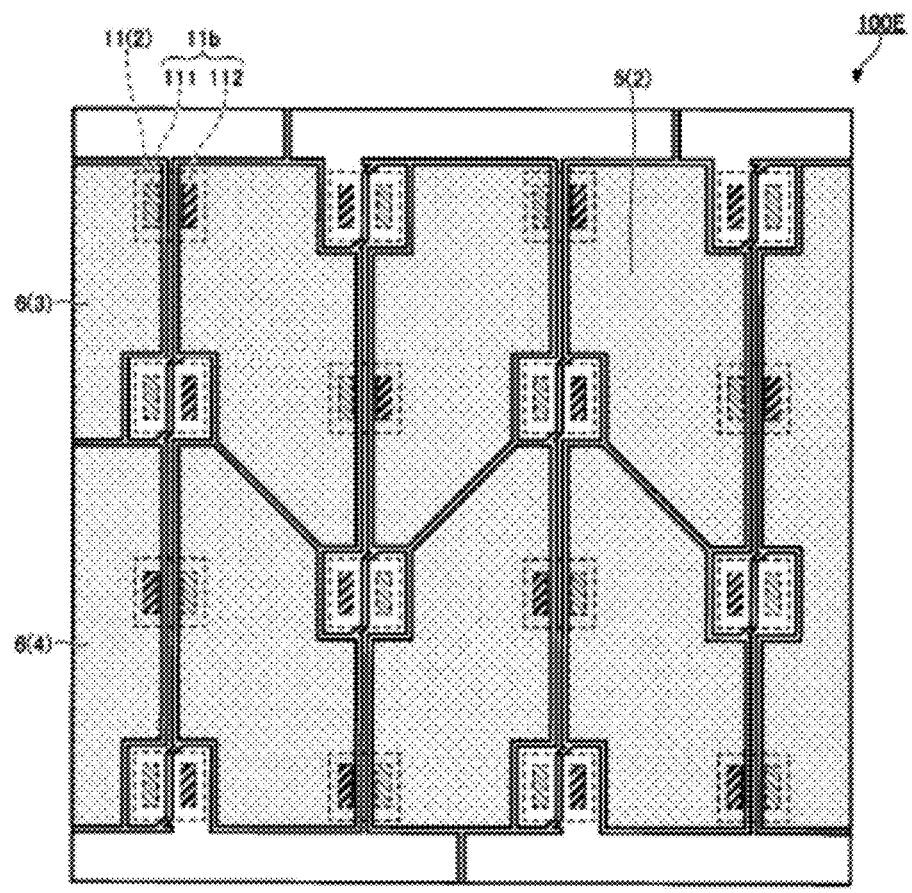
FIGS. 21A and 21B schematically show connection of second wiring 5(2) shown in FIG. 19.
Figure 21B:

As shown in FIG. 21A, for example, the portion 6(3) of the second wiring 5(2) serves as the anode-side external connecting terminal, and the portion 6(4) of the second wiring 5(2) serves as the cathode-side external connecting terminal. In this case, eight light-emitting elements 11(2) are connected in series as shown in FIG. 21A. When a predetermined voltage is applied between the anode-side external connecting terminal 6(3) and the cathode-side external connecting terminal 6(4), a current flows through each light-emitting element 11(2), and each light-emitting element 11(2) emits light.

Figure 22:
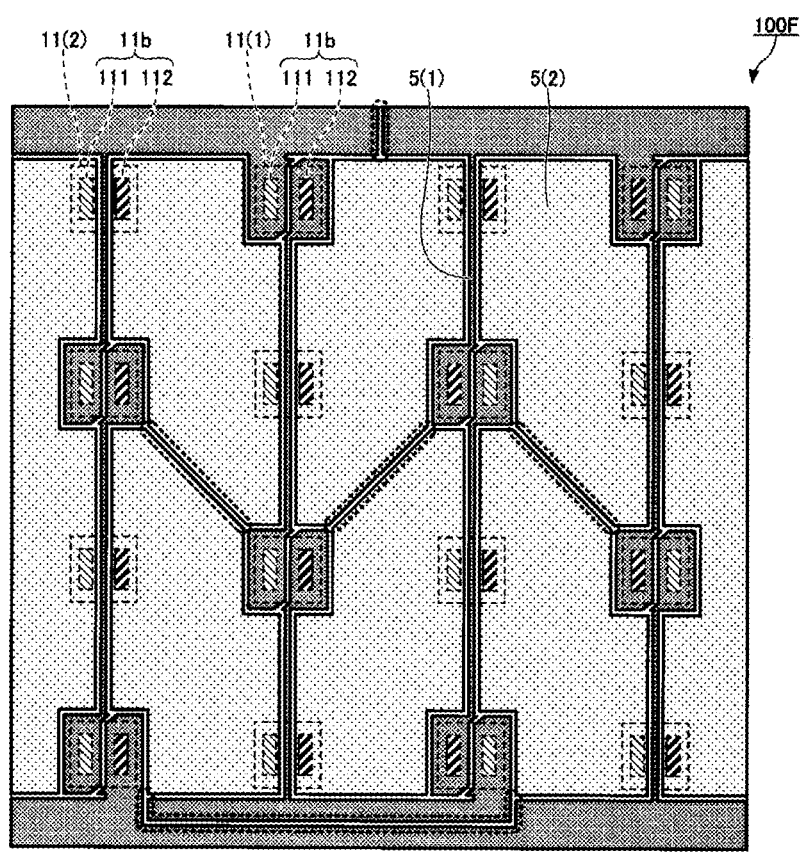
FIG. 22 is a schematic bottom view of an illustrative light-emitting module according to a fourth modified example of the first embodiment.
Figure 23A:
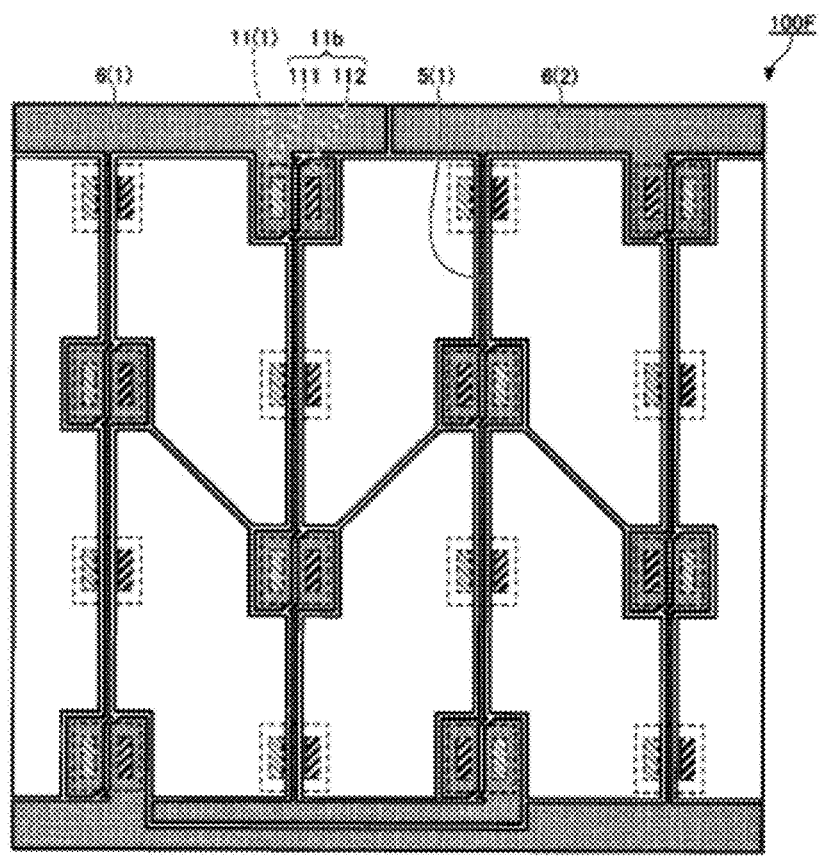
FIGS. 23A and 23B schematically show connection of first wiring 5(1) shown in FIG. 22.
Figure 23B:
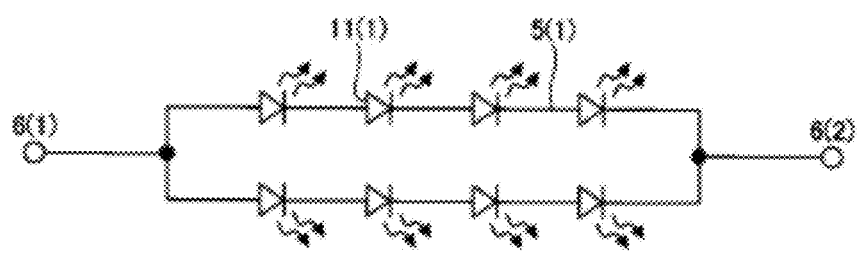

FIG. 22 is a schematic bottom view of an illustrative light-emitting module according to the fourth modified example of the first embodiment. Only the first wiring 5(1) shown in FIG. 22 is indicated by the dot pattern in FIG. 23A, and FIG. 23B schematically shows the connection of the light-emitting elements 11(1) by the first wiring 5(1). Only the second wiring 5(2) shown in FIG. 22 is indicated by the dot pattern in FIG. 24A, and FIG. 24B schematically shows the connection of the light-emitting elements 11(2) by the second wiring 5(2).

In a light-emitting module 100F shown in FIG. 22, separation grooves enclosed by dashed lines are added to the light-emitting module 100 shown in FIG. 2. The circuit connection shown in FIG. 23A to FIG. 24B is thus provided.

As shown in FIG. 23A, for example, the portion 6(1) of the first wiring 5(1) serves as the anode-side external connecting terminal, and the portion 6(2) of the first wiring 5(1) serves as the cathode-side external connecting terminal. In this case, two series circuits each containing four light-emitting elements 11(1) are connected in parallel as shown in FIG. 23B. When a predetermined voltage is applied between the anode-side external connecting terminal 6(1) and the cathode-side external connecting terminal 6(2), a current flows through each light-emitting element 11(1), and each light-emitting element 11(1) emits light.

Figure 24A:
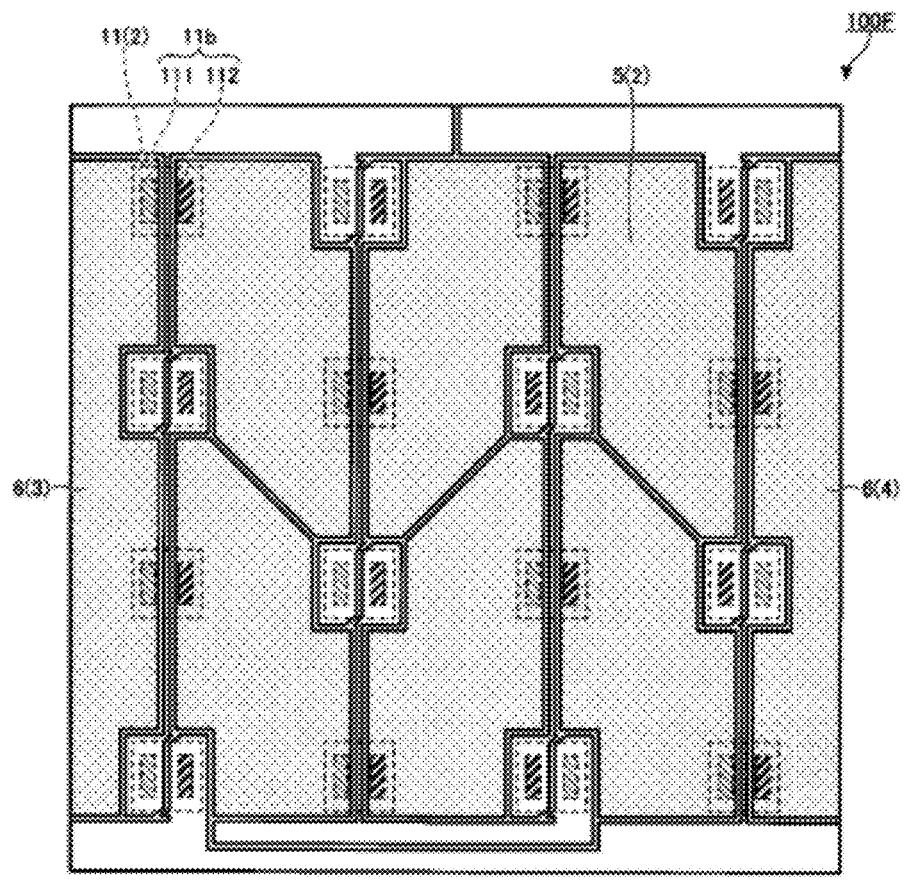
FIGS. 24A and 24B schematically show connection of second wiring 5(2) shown in FIG. 22.
Figure 24B:
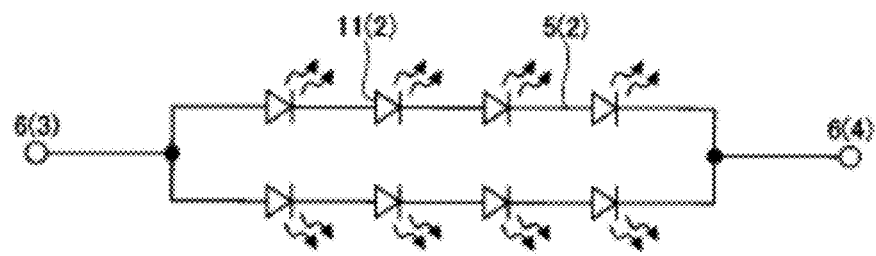

As shown in FIG. 24A, for example, the portion 6(3) of the second wiring 5(2) serves as the anode-side external connecting terminal, and the portion 6(4) of the second wiring 5(2) serves as the cathode-side external connecting terminal. In this case, two series circuits each containing four light-emitting elements 11(2) are connected in parallel as shown in FIG. 24B. When a predetermined voltage is applied between the anode-side external connecting terminal 6(3) and the cathode-side external connecting terminal 6(4), a current flows through each light-emitting element 11(2), and each light-emitting element 11(2) emits light.

Figure 25:
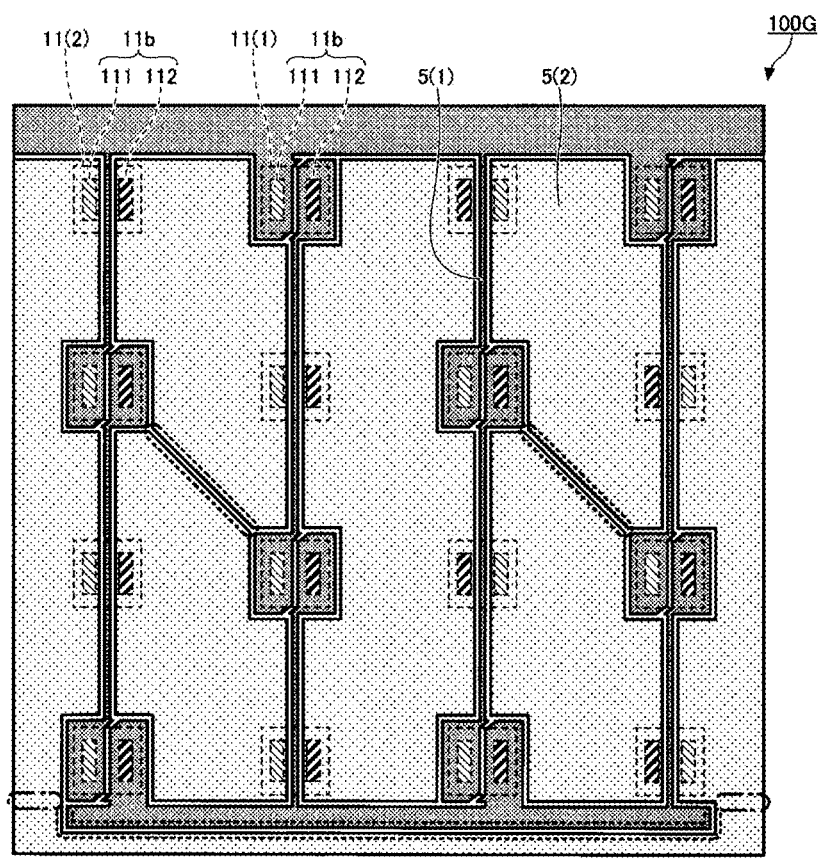
FIG. 25 is a schematic bottom view of an illustrative light-emitting module according to a fifth modified example of the first embodiment.
Figure 26A:
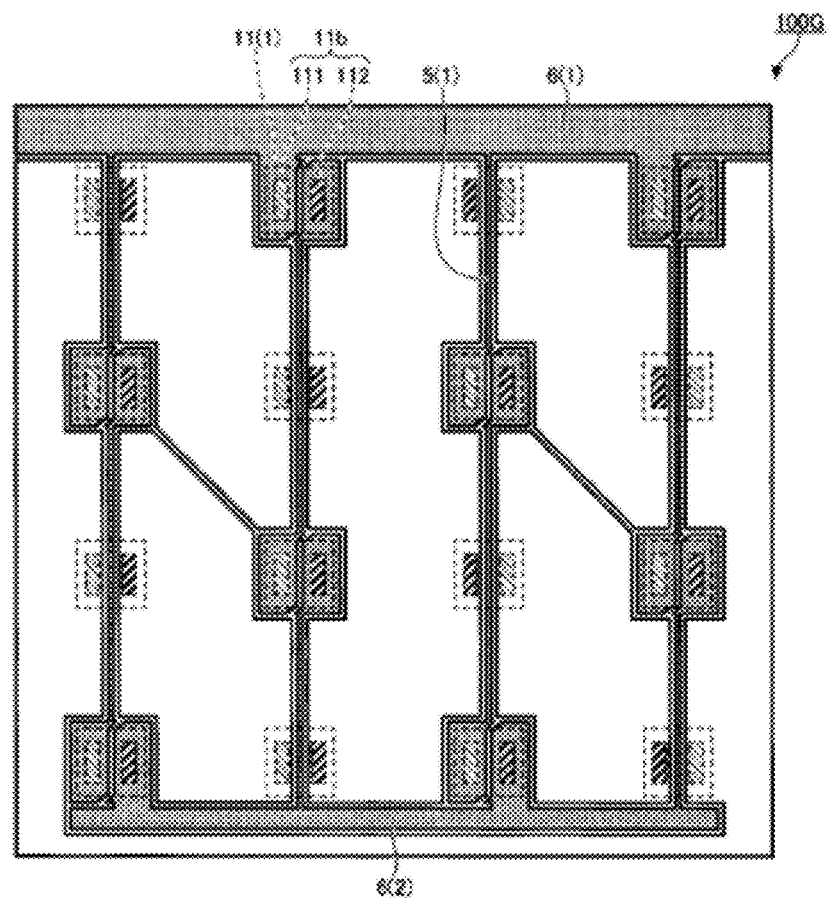
FIGS. 26A and 26B schematically show connection of first wiring 5(1) shown in FIG. 25.
Figure 26B:
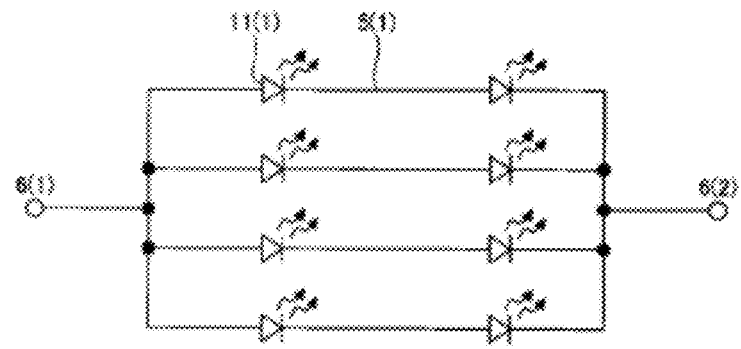

FIG. 25 is a schematic bottom view of an illustrative light-emitting module according to the fifth modified example of the first embodiment. Only the first wiring 5(1) shown in FIG. 25 is indicated by the dot pattern in FIG. 26A, and FIG. 26B schematically shows the connection of the light-emitting elements 11(1) by the first wiring 5(1). Only the second wiring 5(2) shown in FIG. 25 is indicated by the dot pattern in FIG. 27A, and FIG. 27B schematically shows the connection of the light-emitting elements 11(2) by the second wiring 5(2).

In a light-emitting module 100G shown in FIG. 25, separation grooves enclosed by dashed lines are added to the light-emitting module 100 shown in FIG. 2, and the separation grooves otherwise provided in the regions enclosed by dot-dash lines are eliminated. The circuit connection shown in FIG. 26A to FIG. 27B is thus provided.

As shown in FIG. 26A, for example, the portion 6(1) of the first wiring 5(1) serves as the anode-side external connecting terminal, and the portion 6(2) of the first wiring 5(1) serves as the cathode-side external connecting terminal. In this case, four series circuits each containing two light-emitting elements 11(1) are connected in parallel as shown in FIG. 26B. When a predetermined voltage is applied between the anode-side external connecting terminal 6(1) and the cathode-side external connecting terminal 6(2), a current flows through each light-emitting element 11(1), and each light-emitting element 11(1) emits light.

Figure 27A:
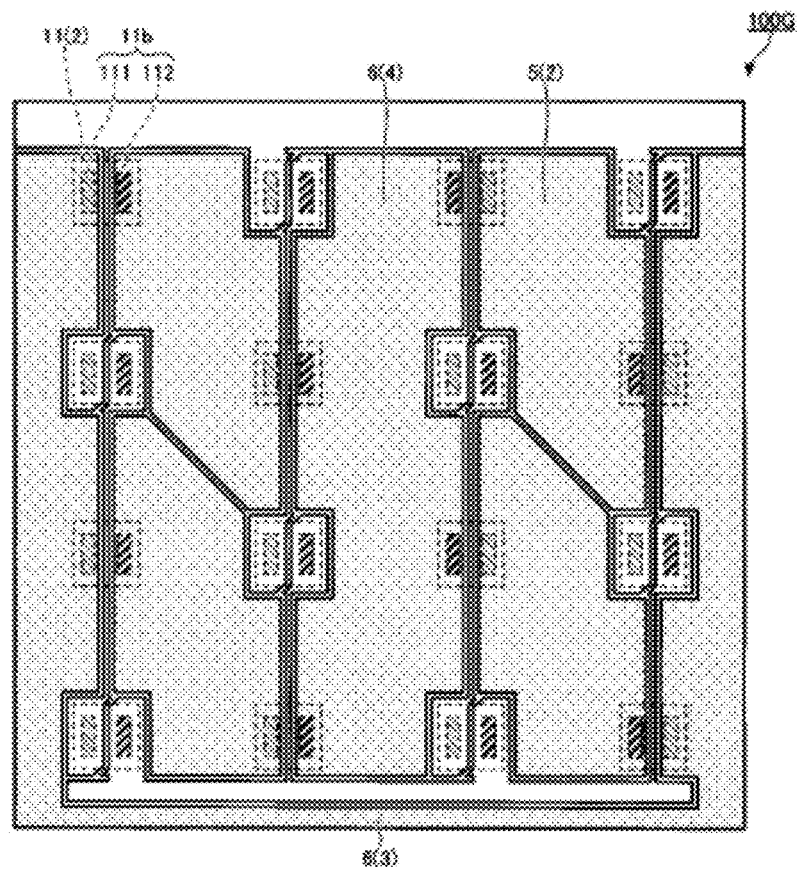
FIGS. 27A and 27B schematically show connection of second wiring 5(2) shown in FIG. 25.
Figure 27B:
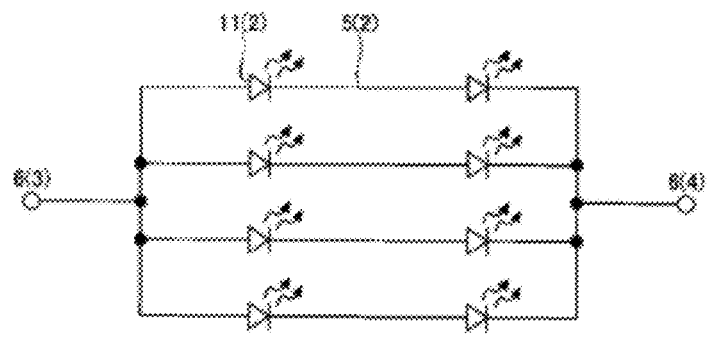

As shown in FIG. 27A, for example, the portion 6(3) of the second wiring 5(2) serves as the anode-side external connecting terminal, and the portion 6(4) of the second wiring 5(2) serves as the cathode-side external connecting terminal. In this case, four series circuits each containing two light-emitting elements 11(2) are connected in parallel as shown in FIG. 27B. When a predetermined voltage is applied between the anode-side external connecting terminal 6(3) and the cathode-side external connecting terminal 6(4), a current flows through each light-emitting element 11(2), and each light-emitting element 11(2) emits light.

As described above, the separation grooves can be easily added or eliminated on the basis of the light-emitting module 100 shown in FIG. 2. Light-emitting modules including various wiring patterns in each of which a plurality of light-emitting elements 11(1) include light-emitting elements connected in parallel and light-emitting elements connected in series and in each of which a plurality of light-emitting elements 11(2) include light-emitting elements connected in parallel and light-emitting elements connected in series can thus be provided. The additional separation grooves can be formed with a laser, similarly to the other separation grooves.

Second Embodiment

In a second embodiment, in illustrative liquid-crystal display device employing the light-emitting module according to the first embodiment as a backlight source is described. In the second embodiment, description of the same components as in the embodiment described above may be omitted.

Figure 28:
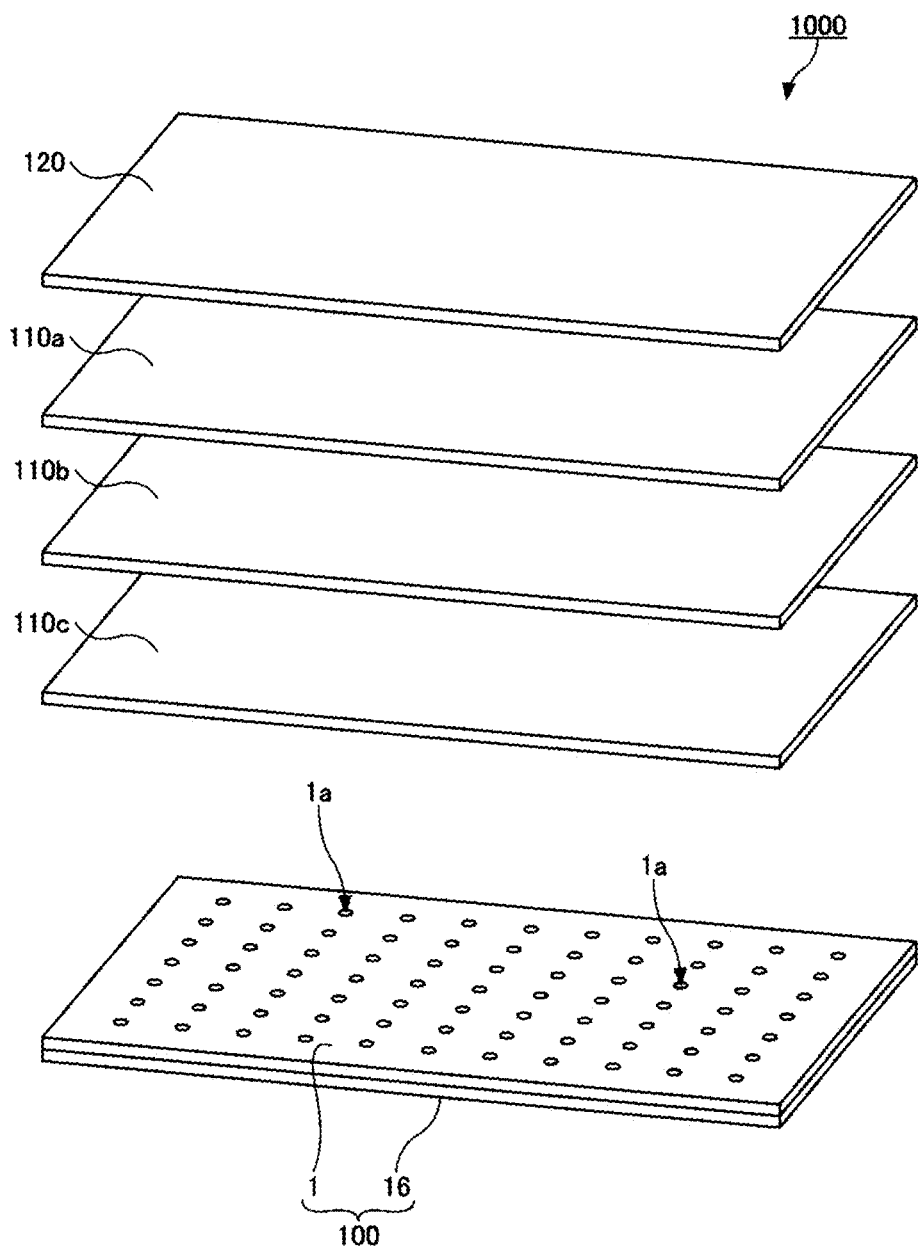
FIG. 28 is a schematic diagram showing the structure of an illustrative liquid-crystal display device according to a second embodiment.

FIG. 28 is a schematic diagram showing the structure of the illustrative liquid-crystal display device according to the second embodiment. As shown in FIG. 28, a liquid-crystal display device 1000 includes a liquid-crystal panel 120, two lens sheets 110a and 110b, a diffusion sheet 110c, and the light-emitting module 100 according to the first embodiment in this order from the top.

The liquid-crystal display device 1000 is what is called a direct-lit liquid-crystal display device in which the light-emitting module 100 is disposed below the liquid-crystal panel 120. In the liquid-crystal display device 1000, the liquid-crystal panel 120 is irradiated with light emitted from the light-emitting module 100. Other members such as a polarizing film and a color filter may be included in addition to the components described above.

Generally, because the distance between a liquid-crystal panel and the light-emitting module is reduced in a direct-lit liquid-crystal display device, unevenness in emission color and unevenness in luminance of the light-emitting module may affect unevenness in emission color and unevenness in luminance of the liquid-crystal display device. Accordingly, a light-emitting module with reduced unevenness in emission color and unevenness in luminance is desired as a light-emitting module for a direct-lit liquid-crystal display device. By using the light-emitting module 100 for the liquid-crystal display device 1000, unevenness in luminance and unevenness in emission color can be reduced, while maintaining a reduced thickness of the light-emitting module 100, such as 5 mm or less, 3 mm or less, and 1 mm or less.

The case in which a single light-emitting module 100 is used as a backlight for the single liquid-crystal display device 1000 is not limiting. A plurality of light-emitting modules 100 may be arranged to constitute a backlight for the single liquid-crystal display device 1000. For example, producing a plurality of small light-emitting modules 100 and inspecting each of the small light-emitting modules 100 allows for improving the yield compared with the case of producing a large light-emitting module 100 in which many light-emitting elements 11 are mounted.

The light-emitting module 100 is preferably used as a backlight for the liquid-crystal display device 1000 because light with uniform intensity is emitted from the light-guiding plate 1 as described above.

The use described above is not limiting, and the light-emitting module 100 can be suitably used as a backlight for a television, a tablet, a smartphone, a smartwatch, a head-up display, digital signage, or a bulletin board. The light-emitting module 100 can also be used as a light source for lighting for an emergency light, a linear lighting, various illuminations, or vehicle installation. Any of the light-emitting modules 100A to 100G may be used instead of the light-emitting module 100.

Preferable embodiments and the like have been described above in detail, but the embodiments and the like described above are not limiting. Various modified examples and replacement can be performed on the embodiments and the like described above within the scope of the claims.

For example, a light-transmissive member having a function such as diffusing may be further layered on the light-guiding plate 1. In the case in which the optical functional portion 1a is a recess, the light-transmissive member is preferably disposed such that the light-transmissive member blocks the opening (in other words, a portion close to the first main surface 1c of the light-guiding plate 1) of the recess but does not fill up the recess. This structure allows an air layer to be present in the recess of the optical functional portion 1a and allows light emitted from the light-emitting element 11 to spread out well.

I claim:

1. A light-emitting module comprising:
a light-guiding plate having a light-extracting surface;
a plurality of first light-emitting elements and a plurality of second light-emitting elements having a light-emission characteristic different from a light-emission characteristic of the first light-emitting elements, the first light-emitting elements and the second light-emitting elements being alternately mounted on a surface of the light-guiding plate opposite to the light-extracting surface, with electrodes facing a direction opposite to the light-extracting surface of the light-guiding plate;
a light-reflective member covering each of the first light-emitting elements and each of the second light-emitting elements to expose electrodes of each of the first light-emitting elements and electrodes of each of the second light-emitting elements from a first surface;
first wiring formed on the first surface to connect the electrodes of the first light-emitting elements; and
second wiring formed on the first surface to connect the electrodes of the second light-emitting elements,
wherein the electrodes of each of the first light-emitting elements comprise an anode electrode and a cathode electrode,
wherein the electrodes of each of the second light-emitting elements comprise an anode electrode and a cathode electrode,
wherein the first wiring comprises an interelectrode trace passing through an interelectrode region between the anode electrode and the cathode electrode of each of the second light-emitting elements, and
wherein the second wiring does not comprise a trace passing through an interelectrode region between the anode electrode and the cathode electrode of each of the first light-emitting elements.

2. The light-emitting module according to claim 1,
wherein fixed-width separation grooves are formed on both sides of the interelectrode trace,
wherein one of the separation grooves separates the second wiring connected to the anode electrode of one of the second light-emitting elements from the interelectrode trace,
wherein another one of the separation grooves separates the second wiring connected to the cathode electrode of the second light-emitting element from the interelectrode trace, and
wherein the interelectrode trace and the one and the other separation grooves extend from the interelectrode region of the second light-emitting element toward one of the first light-emitting elements adjacent to the second light-emitting element.

3. The light-emitting module according to claim 2, wherein the one of the separation grooves passes through the interelectrode region of the first light-emitting element adjacent to the second light-emitting element to separate the first wiring connected to the anode electrode of the first light-emitting element from the first wiring connected to the cathode electrode of the first light-emitting element.

4. The light-emitting module according to claim 3, wherein the other one of the separation grooves passes outside the anode electrode or the cathode electrode of the first light-emitting element adjacent to the second light-emitting element and merges with the one of the separation grooves passing through the interelectrode region of the first light-emitting element.

5. The light-emitting module according to claim 1,
wherein the plurality of first light-emitting elements comprise:
first light-emitting elements connected to each other in parallel; and
first light-emitting elements connected to each other in series, and
wherein the plurality of second light-emitting elements comprise:
second light-emitting elements connected to each other in parallel; and
second light-emitting elements connected to each other in series.

6. The light-emitting module according to claim 1, wherein the plurality of first light-emitting elements and the plurality of second light-emitting elements are arranged in a checkered pattern.

7. A liquid-crystal display device comprising the light-emitting module according to claim 1 as a backlight source.

8. A liquid-crystal display device comprising the light-emitting module according to claim 2 as a backlight source.

9. A liquid-crystal display device comprising the light-emitting module according to claim 3 as a backlight source.

10. A liquid-crystal display device comprising the light-emitting module according to claim 4 as a backlight source.

11. A liquid-crystal display device comprising the light-emitting module according to claim 5 as a backlight source.

12. A liquid-crystal display device comprising the light-emitting module according to claim 6 as a backlight source.

13. A method for manufacturing the light-emitting module according to claim 1, comprising:
providing:
a light-guiding plate having a light-extracting surface; and
a plurality of first light-emitting elements and a plurality of second light-emitting elements having a light-emission characteristic different from a light-emission characteristic of the first light-emitting elements, the first light-emitting elements and the second light-emitting elements being alternately mounted on a surface of the light-guiding plate opposite to the light-extracting surface, with electrodes facing a direction opposite to the light-extracting surface of the light-guiding plate, and
the step of providing comprising a step of forming a light-reflective member covering each of the first light-emitting elements and each of the second light-emitting elements to expose electrodes of each of the first light-emitting elements and electrodes of each of the second light-emitting elements from a first surface;
forming a metal layer on the entire first surface; and
forming first wiring connecting the electrodes of the first light-emitting elements and second wiring connecting the electrodes of the second light-emitting elements by removing a portion of the metal layer with a laser.

14. The method for manufacturing a light-emitting module according to claim 13,
wherein the electrodes of each of the second light-emitting elements comprise an anode electrode and a cathode electrode, and
wherein the step of forming the first wiring and the second wiring comprises forming two fixed-width separation grooves in an interelectrode region between the anode electrode and the cathode electrode to form, in the interelectrode region, an interelectrode trace comprised in the first wiring and to separate a portion of the second wiring connected to the anode electrode from a portion of the second wiring connected to the cathode electrode.

* * * * *